United States Patent
Naruse et al.

(10) Patent No.: US 9,865,039 B2
(45) Date of Patent: Jan. 9, 2018

(54) RESTORATION FILTER GENERATION DEVICE AND IMAGE PROCESSING DEVICE

(71) Applicant: FUJIFILM Corporation, Tokyo (JP)

(72) Inventors: Yousuke Naruse, Saitama (JP); Kenkichi Hayashi, Saitama (JP); Masahiko Sugimoto, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 165 days.

(21) Appl. No.: 14/850,479

(22) Filed: Sep. 10, 2015

(65) Prior Publication Data

US 2016/0027157 A1 Jan. 28, 2016

Related U.S. Application Data

(63) Continuation of application No. PCT/JP2014/050557, filed on Jan. 15, 2014.

(30) Foreign Application Priority Data

Mar. 18, 2013 (JP) ................. 2013-055195

(51) Int. Cl.
- *G06T 5/00* (2006.01)
- *H04N 9/04* (2006.01)
- (Continued)

(52) U.S. Cl.
CPC ............... *G06T 5/003* (2013.01); *G06T 5/20* (2013.01); *H04N 9/045* (2013.01); (Continued)

(58) Field of Classification Search
None
See application file for complete search history.

(56) References Cited

U.S. PATENT DOCUMENTS

| | | | |
|---|---|---|---|
| 2011/0149103 A1* | 6/2011 | Hatakeyama | G06T 5/003 348/222.1 |
| 2011/0199514 A1 | 8/2011 | Tamura | |

(Continued)

FOREIGN PATENT DOCUMENTS

| | | |
|---|---|---|
| JP | 2010-140442 A | 6/2010 |
| JP | 2011-193277 A | 9/2011 |

(Continued)

OTHER PUBLICATIONS

International Preliminary Report on Patentability and Written Opinion of the International Searching Authority, with an English Translation, dated Oct. 1, 2015, for International Application No. PCT/JP2014/050557.

(Continued)

*Primary Examiner* — Bernard Krasnic
(74) *Attorney, Agent, or Firm* — Birch, Stewart, Kolasch & Birch, LLP

(57) ABSTRACT

A restoration filter generation device according to one embodiment of the present invention includes: an information acquisition unit that acquires information showing a difference that depends on a color of an optical transfer function of an optical system; and a restoration filter generation unit that generates a restoration filter, which weakens restoration strength according to the difference that depends on the color of the optical transfer function on the basis of the information acquired by the information acquisition unit, and makes the restoration strength of the restoration filter weaker than the restoration strength of an ideal filter decided assuming that the difference that depends on the color of the optical transfer function does not exist. As a result, the overcorrection is reduced.

14 Claims, 19 Drawing Sheets

(51) Int. Cl.
*G06T 5/20* (2006.01)
*H04N 5/225* (2006.01)

(52) U.S. Cl.
CPC .............. *G06T 2207/10024* (2013.01); *G06T 2207/20012* (2013.01); *G06T 2207/20024* (2013.01); *G06T 2207/20056* (2013.01); *G06T 2207/20076* (2013.01); *H04N 5/2254* (2013.01)

(56) References Cited

U.S. PATENT DOCUMENTS

| | | | | |
|---|---|---|---|---|
| 2011/0285879 | A1* | 11/2011 | Hatakeyama | G06T 5/003 348/241 |
| 2012/0069237 | A1 | 3/2012 | Kishine | |
| 2012/0154626 | A1* | 6/2012 | Hatakeyama | H04N 9/646 348/223.1 |

FOREIGN PATENT DOCUMENTS

| | | |
|---|---|---|
| JP | 2012-65187 A | 3/2012 |
| JP | 2012-129932 A | 7/2012 |
| JP | 2012-256118 A | 12/2012 |
| WO | WO 2010/071001 A1 | 6/2010 |

OTHER PUBLICATIONS

International Search Report, issued in PCT/JP2014/050557, dated Apr. 1, 2014.
Written Opinion of the International Searching Authority, issued in PCT/JP2014/050557, dated Apr. 1, 2014.

* cited by examiner

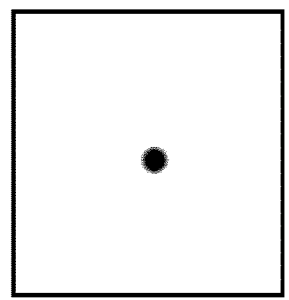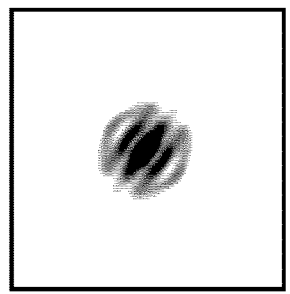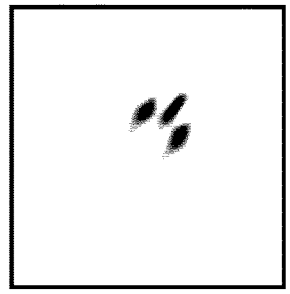
FIG.3

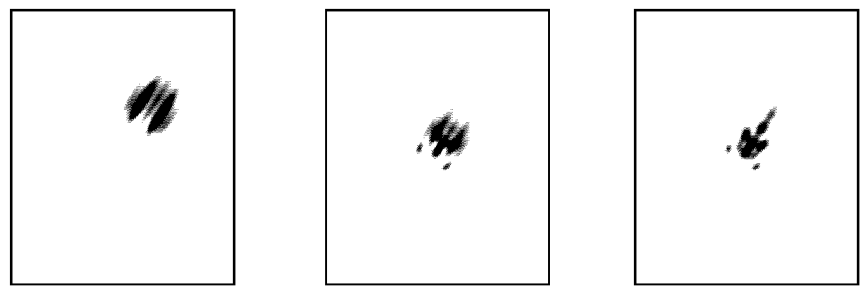
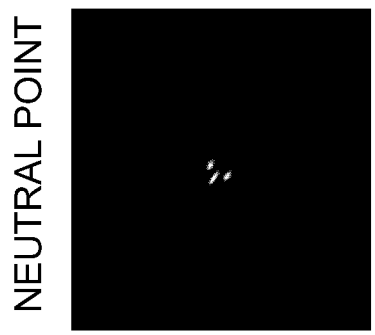
FIG.4

RESTORATION FILTER GENERATION DEVICE AND IMAGE PROCESSING DEVICE

CROSS-REFERENCE TO RELATED APPLICATIONS

This application is a Continuation of PCT International Application No. PCT/JP2014/050557 filed on Jan. 15, 2014, which claims priority under 35 U.S.C § 119(a) to Japanese Patent Application No. 2013-055195 filed on Mar. 18, 2013. Each of the above application(s) is hereby expressly incorporated by reference, in its entirety, into the present application.

BACKGROUND OF THE INVENTION

Field of the Invention

The present invention relates to a restoration filter generation device and method that generate a restoration filter to perform restoration processing on luminance system image data generated on the basis of the image data of each color of multiple colors, an image processing device and method that perform restoration processing using this restoration filter, an image capturing apparatus including this image processing device, a program to generate a restoration filter, and a recording medium.

Description of the Related Art

In an image obtained by imaging an object by an image capturing apparatus such as a digital camera, there is a case where image degradation that originates in various aberrations of an optical system (such as an imaging lens) occurs. This image degradation by aberration can be expressed by a PSF (Point Spread Function), or the like. Therefore, the image degradation can be reduced by generating a restoration filter on the basis of the deterioration characteristic of an optical system such as the PSF and performing point image restoration processing (restoration processing) on image data by using this restoration filter.

Japanese Patent Application Laid-Open No. 2010-140442 (hereinafter referred to as PTL 1; especially, see paragraphs [0043] to [0048]) discloses an invention that separates luminance component Y from image data input from an image capturing device, acquires point spread function PSFy (=Wr×PSFr+Wg×PSFg+Wb×PSFb) of the luminance component by synthesizing point spread functions (PSFr, PSFg, PSFb) of respective colors of R, G and B by using coefficients (Wr, Wg, Wb) of R, G and B in the luminance component Y (=Wr×R+Wg×G+Wb×B), and calculates a correction coefficient with respect to luminance component Y on the basis of point spread function PSFy of this luminance component.

Japanese Patent Application Laid-Open No. 2011-193277 (hereinafter referred to as PTL 2) discloses an invention that changes the gain of a restoration filter (amplitude characteristic) according to the amount of adjustment with an adjustment bar by the user in a case where the amplitude characteristic is selected as an adjustment parameter of the restoration filter, and changes the phase angle (phase characteristic) of the restoration filter according to the amount of adjustment with the adjustment bar by the user in a case where the phase characteristic is selected as an adjustment parameter.

Japanese Patent Application Laid-Open No. 2012-129932 (hereinafter referred to as PTL 3) discloses an invention that reduces a difference (chromatic aberration) between color components of a point spread function by relative parallel displacement and generates a restoration filter on the basis of the point spread function.

SUMMARY OF THE INVENTION

In the invention described in PTL 1, since only the luminance component of image data of a correction target is corrected, the phase shift amounts of R, G and B can be averagely returned in all colors, but there is a problem that the excessive return (overcorrection) of phase shift is generated in the color of a specific wavelength. Especially, in a case where phase correction is performed on luminance system image data, phase overcorrection is easily caused unlike a case where phase correction is individually performed on image data (R image data, G image data and B image data) of respective colors of multiple colors (R, G, B). When the phase is overcorrected, an artifact is caused, and image quality may be rather degraded.

In the invention described in PTL 2, the amplitude characteristic (modulation characteristic) and phase characteristic of a restoration filter can be individually adjusted by user input. However, restoration processing is performed on image data of respective colors of R, G and B, a problem of overcorrection in a specific color caused in a case where only the luminance component is corrected is not assumed, and the overcorrection is caused if it is applied to only the correction of the luminance component as it is.

In the invention described in PTL 3, it is possible to generate a restoration filter with respect to image data after chromatic aberration correction, but restoration processing is similarly performed on image data of respective colors of R, G and B, and a problem of overcorrection in a specific color caused in a case where only the luminance component is corrected is not assumed.

It is an object of the present invention to provide a restoration filter generation device and method, an image processing device and method, an image capturing apparatus, a program and a recording medium that can reduce overcorrection according to a difference in an optical transfer function in a case where restoration processing is performed on luminance system image data.

To achieve the above-mentioned object, the present invention provides a restoration filter generation device that generates a restoration filter to perform restoration processing on luminance system image data which is generated based on image data of each color obtained in an image capturing apparatus having an optical system and which is image data related to luminance, including: an information acquisition unit that acquires difference information showing a difference that depends on a color of an optical transfer function of the optical system; and a restoration filter generation unit that generates the restoration filter, where the restoration filter generation unit generates a restoration filter which weakens restoration strength according to the difference that depends on the color, based on the difference information acquired by the information acquisition unit, and which makes the restoration strength weaker than restoration strength of an ideal filter decided assuming that the difference that depends on the color does not exist.

Here, as "optical transfer function", for example, there are a PSF (Point Spread Function, which may be referred to as "point image distribution function" or "point spread function"), an OTF (Optical Transfer Function) obtained by Fourier transform of the PSF, a PTF (Phase Transfer Function, which may be referred to as "phase transfer function") and an MTF (Modulation Transfer Function, which may be referred to as "modulation transfer function" or "amplitude transfer function"). Moreover, "optical transfer function" is not limited to information that directly shows at least one of "amplitude" and "phase". At least one of "amplitude" and "phase" may be calculated by performing specific operation processing on "optical transfer function". That is, "optical transfer function" includes information that indirectly shows at least one of "amplitude" and "phase".

Moreover, "a difference by the color of the optical transfer function of the optical system" is the difference between optical transfer functions of respective colors in the optical system.

According to the present invention, a restoration filter generation unit that generates a restoration filter is included, and the restoration filter generation unit generates a restoration filter which weakens restoration strength according to a difference that depends on the color on the basis of acquired difference information and which makes the restoration strength weaker than the restoration strength of an ideal filter decided assuming that the difference that depends on the color does not exist. Therefore, in a case where a restoration filter to perform restoration processing on luminance system image data is generated, it is possible to generate a restoration filter of high toughness that reduces overcorrection due to the difference by the color of the optical transfer function.

In one embodiment of the present invention, information showing a difference by the color of an optical transfer function (difference information on the optical transfer function) is dispersion of the optical transfer function calculated assuming that the difference that depends on the color of the optical transfer function follows normal distribution. By this means, a restoration filter having restoration strength biased only to a specific color on luminance system image data is prevented from being generated.

In one embodiment of the present invention, the information acquisition unit acquires an optical transfer function of each color and calculates the difference that depends on the color of the optical transfer function based on the optical transfer function of each color. By this means, by preparing only the optical transfer function of each color if information showing the difference by the color of the optical transfer function is not specially prepared, it becomes possible to generate a restoration filter having adequate restoration strength which is not biased to an optical transfer function difference by all colors forming luminance system image data.

In one embodiment of the present invention, the information acquisition unit calculates an average and dispersion of the optical transfer function, assuming that the difference that depends on the color of the optical transfer function follows normal distribution, and the restoration filter generation unit generates the restoration filter based on the average and the dispersion of the optical transfer function. By this means, a restoration filter having restoration strength biased only to a specific color on the luminance system image data is prevented from being generated.

In one embodiment of the present invention, the restoration filter generation unit generates the restoration filter based on an equation in which members of the average and the dispersion are set to a denominator. Moreover, in one embodiment of the present invention, the restoration filter generation unit calculates the average and the dispersion for each spatial frequency, and generates the restoration filter based on the average and the dispersion of the each spatial frequency. By this means, based on "average" that is the center of an optical transfer function difference in all colors forming luminance system image data and "dispersion" showing an optical transfer function difference in all colors forming the luminance system image data, a restoration filter that makes restoration strength weaker as the difference (dispersion) by the color of the optical transfer function is larger is generated.

In one embodiment of the present invention, the restoration filter generation unit makes the restoration strength weaker in a spatial frequency in which the difference that depends on the color of the optical transfer function is larger. By this means, since the restoration strength is weaker as compared with an ideal filter in a spatial frequency with a larger optical transfer function difference, it is possible to perform restoration with restoration strength close to the ideal filter in a spatial frequency with a small optical transfer function difference and suppress overcorrection in a spatial frequency with a large optical transfer function difference.

In one embodiment of the present invention, the information acquisition unit acquires color probability distribution in the luminance system image data obtained in the image capturing apparatus and the optical transfer function of each color, and, based on the acquired color probability distribution in the luminance system image data and the acquired optical transfer function of each color, calculates information (difference information) showing the difference by the color of the optical transfer function, assuming that the difference that depends on the color of the optical transfer function follows normal distribution. By this means, by preparing color probability distribution in the luminance system image data and the optical transfer function of each color, it becomes possible to generate a restoration filter having adequate restoration strength which is not biased to an optical transfer function difference by all colors forming the luminance system image data.

In one embodiment of the present invention, the difference information includes at least a difference due to manufacture of the optical system of the optical transfer function of the optical system, and the restoration filter generation unit generates a restoration filter that makes the restoration strength of the restoration filter weaker than restoration strength of an ideal filter decided assuming that the difference due to manufacture of the optical system does not exist. By this means, it is possible to reduce overcorrection according to the difference by manufacture of the optical transfer function.

In one embodiment of the present invention, the difference information includes a difference that depends on an imaging condition of the optical transfer function, and the restoration filter generation unit makes the restoration strength of the restoration filter weaker than restoration strength of an ideal filter decided assuming that the difference that depends on the imaging condition does not exist. By this means, it is possible to reduce overcorrection according to the difference by the imaging condition of the optical transfer function.

In one embodiment of the present invention, the restoration filter generation unit generates the restoration filter that performs restoration processing with at least phase restoration. By this means, it becomes possible to generate a restoration filter of high toughness with respect to the difference by the color especially in the restoration processing with the phase restoration.

In one embodiment of the present invention, the restoration filter generation unit generates the restoration filter that performs restoration processing without phase restoration. By this means, it becomes possible to generate a restoration filter of high toughness with respect to the difference by the color in the restoration processing without the phase restoration.

In one embodiment of the present invention, the restoration filter generation unit generates a Wiener filter as the restoration filter.

In one embodiment of the present invention, the optical system has a lens unit that modulates a phase and extends a depth of field.

Moreover, the present invention provides a restoration filter generation device that generates a restoration filter to perform restoration processing on image data obtained in an image capturing apparatus having an optical system, including: an information acquisition unit that acquires difference information showing a difference due to manufacture of the optical system in an optical transfer function of the optical system; and a restoration filter generation unit that generates the restoration filter, where: the difference information is dispersion of the optical transfer function calculated assuming that the difference due to manufacture of the optical system follows normal distribution; and the restoration filter generation unit generates a restoration filter which weakens restoration strength according to the difference due to manufacture of the optical system, based on the acquired difference information, and which makes the restoration strength weaker than restoration strength of an ideal filter decided assuming that the difference due to manufacture of the optical system does not exist, by calculating the restoration strength based on an equation in which a member of the dispersion is set to a denominator. By this means, it becomes possible to generate a restoration filter of high toughness that reduces overcorrection with respect to the difference due to manufacture of the optical system in the optical transfer function. Moreover, it becomes possible to generate a restoration filter having adequate restoration strength which is not biased to all individuals of the optical system without generating a restoration filter having restoration strength which is biased only to a specific individual of the optical system.

Moreover, the present invention provides a restoration filter generation device that generates a restoration filter to perform restoration processing on image data obtained in an image capturing apparatus having an optical system, including: an information acquisition unit that acquires difference information showing a difference that depends on an imaging condition of an optical transfer function of the optical system; and a restoration filter generation unit that generates the restoration filter, where: the difference information is dispersion of the optical transfer function calculated assuming that the difference that depends on the imaging condition follows normal distribution; and the restoration filter generation unit generates a restoration filter which weakens restoration strength according to the difference that depends on the imaging condition, based on the acquired difference information, and which makes the restoration strength weaker than restoration strength of an ideal filter decided assuming that the difference that depends on the imaging condition does not exist, by calculating the restoration strength based on an equation in which a member of the dispersion is set to a denominator. It is possible to generate a restoration filter of high toughness that reduces overcorrection with respect to the difference that depends on the imaging condition of the optical transfer function. Moreover, it becomes possible to generate a restoration filter having adequate restoration strength which is not biased to the difference that depends on the imaging condition of the optical transfer function without generating a restoration filter having restoration strength which is biased only to a specific imaging condition.

Moreover, the present invention provides an image processing device including: an image data acquisition unit that acquires luminance system image data which is generated based on image data of each color obtained in an image capturing apparatus having an optical system and which is image data related to luminance; a restoration filter storage unit that stores a restoration filter generated by a restoration filter generation device; and a restoration processing unit that performs restoration processing on the luminance system image data acquired in the image data acquisition unit, using the restoration filter stored in the restoration filter storage unit.

Moreover, the present invention provides an image processing device including: an image data acquisition unit that acquires image data obtained in an image capturing apparatus having an optical system; a restoration filter storage unit that stores a restoration filter generated by a restoration filter generation device; and a restoration processing unit that performs restoration processing on the image data acquired in the image data acquisition unit, using the restoration filter stored in the restoration filter storage unit.

Moreover, the present invention provides an image processing device including a restoration filter generation device.

Moreover, the present invention provides an image capturing apparatus including: an optical system; an imaging element that outputs image data of each color of multiple colors; and an image processing device.

Moreover, the present invention provides a restoration filter generation method that generates a restoration filter to perform restoration processing on luminance system image data which is generated based on image data of each color obtained in an image capturing apparatus having an optical system and which is image data related to luminance, including: an information acquisition step of acquiring difference information showing a difference that depends on a color of an optical transfer function of the optical system; and a restoration filter generation step of generating the restoration filter, where the restoration filter generation step generates a restoration filter which weakens restoration strength according to the difference that depends on the color, based on the acquired difference information, and which makes the restoration strength weaker than restoration strength of an ideal filter decided assuming that the difference that depends on the color does not exist.

Moreover, the present invention provides a restoration filter generation method that generates a restoration filter to perform restoration processing on image data obtained in an image capturing apparatus having an optical system, including: an information acquisition step of acquiring difference information showing a difference due to manufacture of the optical system in an optical transfer function of the optical system; and a restoration filter generation step of generating the restoration filter, where: the difference information is dispersion of the optical transfer function calculated assuming that the difference due to manufacture of the optical system follows normal distribution; and the restoration filter generation step generates a restoration filter which weakens restoration strength according to the difference due to manufacture of the optical system of the optical transfer function, based on the acquired difference information, and which makes the restoration strength weaker than restoration strength of an ideal filter decided assuming that the difference due to manufacture of the optical system does not exist, by calculating the restoration strength based on an equation in which a member of the dispersion is set to a denominator.

Moreover, the present invention provides a restoration filter generation method that generates a restoration filter to perform restoration processing on image data obtained in an image capturing apparatus having an optical system, including: an information acquisition step of acquiring difference information showing a difference that depends on an imaging condition of an optical transfer function of the optical system; and a restoration filter generation step of generating the restoration filter, where: the difference information acquired in the information acquisition step is dispersion of the optical transfer function calculated assuming that the difference that depends on the imaging condition follows normal distribution; and the restoration filter generation step generates a restoration filter which weakens restoration strength according to the difference that depends on the imaging condition, based on the acquired difference information, and which makes the restoration strength weaker than restoration strength of an ideal filter decided assuming that the difference that depends on the imaging condition does not exist, by calculating the restoration strength based on an equation in which a member of the dispersion is set to a denominator.

Moreover, the present invention provides an image processing method including: an image data acquisition step of acquiring luminance system image data which is generated based on image data of each color obtained by an image capturing apparatus having an optical system and which is image data related to luminance; and a restoration processing step of performing restoration processing on the luminance system image data acquired in the image data acquisition step, using the restoration filter generated by a restoration filter generation method.

Moreover, the present invention provides an image processing method including: an image data acquisition step of acquiring image data obtained by an image capturing apparatus having an optical system; and a restoration processing step of performing restoration processing on the image data acquired in the image data acquisition step, using the restoration filter generated by a restoration filter generation method.

Moreover, the present invention provides a program that causes a computer to perform processing that generates a restoration filter to perform restoration processing on luminance system image data which is generated based on image data of each color obtained in an image capturing apparatus having an optical system and which is image data related to luminance, including: an information acquisition step of acquiring difference information showing a difference that depends on a color of an optical transfer function of the optical system; and a restoration filter generation step of generating the restoration filter, where the restoration filter generation step generates a restoration filter which weakens restoration strength according to the difference that depends on the color, based on the acquired difference information, and which makes the restoration strength weaker than restoration strength of an ideal filter decided assuming that the difference that depends on the color does not exist.

Moreover, the present invention provides a program that causes a computer to perform processing that generates a restoration filter to perform restoration processing on image data obtained in an image capturing apparatus having an optical system, including: an information acquisition step of acquiring dispersion of an optical transfer function calculated assuming that a difference due to manufacture of the optical system follows normal distribution, as difference information showing the difference due to manufacture of the optical system in the optical transfer function of the optical system; and a restoration filter generation step of generating the restoration filter, where the restoration filter generation step generates a restoration filter which weakens restoration strength according to the difference due to manufacture of the optical system, based on the acquired difference information, and which makes the restoration strength weaker than restoration strength of an ideal filter decided assuming that the difference due to manufacture of the optical system does not exist, by calculating the restoration strength based on an equation in which a member of the dispersion is set to a denominator.

Moreover, the present invention provides a program that causes a computer to perform processing that generates a restoration filter to perform restoration processing on image data obtained in an image capturing apparatus having an optical system, including: an information acquisition step of acquiring dispersion of an optical transfer function calculated assuming that a difference that depends on an imaging condition follows normal distribution, as difference information showing the difference that depends on the imaging condition of the optical transfer function of the optical system; and a restoration filter generation step of generating the restoration filter, where the restoration filter generation step generates a restoration filter which weakens restoration strength according to the difference that depends on the imaging condition, based on the acquired difference information, and which makes the restoration strength weaker than restoration strength of an ideal filter decided assuming that the difference that depends on the imaging condition does not exist, by calculating the restoration strength based on an equation in which a member of the dispersion is set to a denominator.

Moreover, the present invention provides a computer-readable recording medium in which a program according to any one of the above-mentioned modes is recorded.

According to the present invention, it is possible to reduce overcorrection according to a difference in an optical transfer function.

BRIEF DESCRIPTION OF THE DRAWINGS

FIG. 3 is an explanatory diagram to describe a difference between amplitude correction and phase correction.

FIG. 4 is an explanatory diagram to describe that a difference is caused in an optical transfer function depending on the color.

DETAILED DESCRIPTION OF THE PREFERRED EMBODIMENTS

Embodiments of the present invention are described with reference to the accompanying drawings.

<System Configuration Example>

Figure 1:
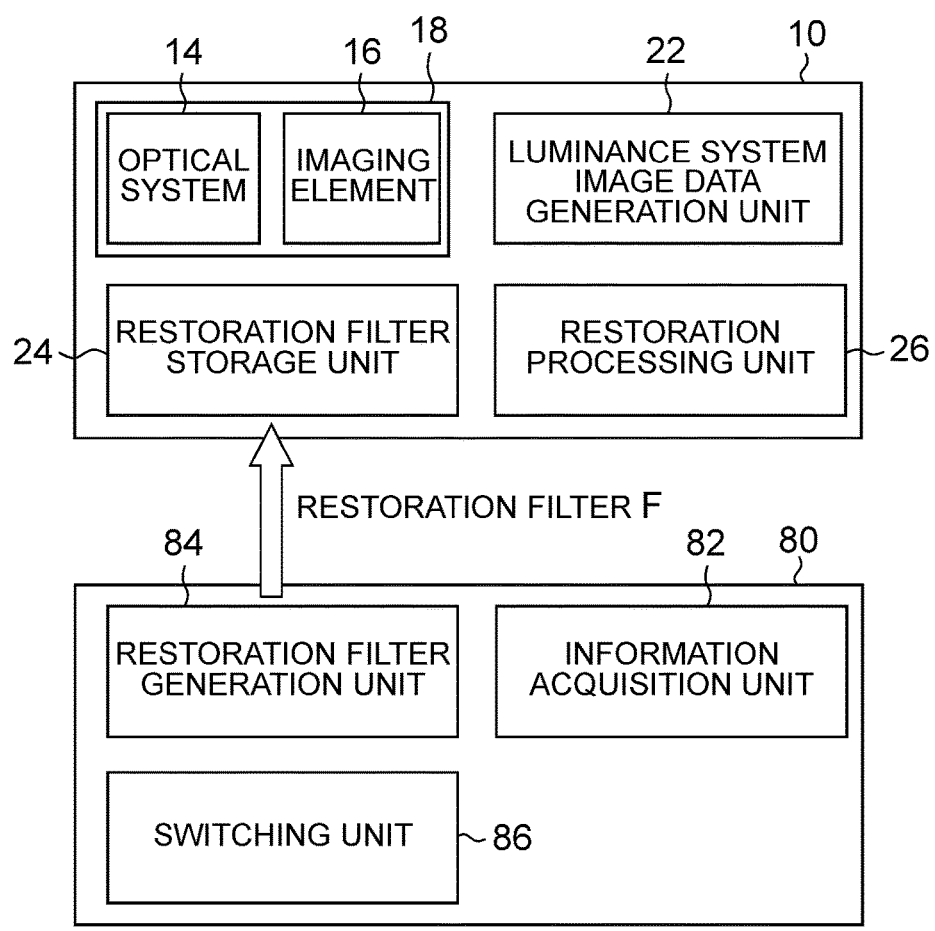
FIG. 1 is a block diagram illustrating a system configuration example including a restoration filter generation device to which the present invention is applied and a digital camera which is one example of an image processing device.

FIG. 1 is a block diagram illustrating a system configuration example including a restoration filter generation device to which the present invention is applied and a digital camera which is one example of an image processing device.

A digital camera 10 (image capturing apparatus) is configured including: an image capturing unit 18 including an optical system 14 and an imaging element 16; a luminance system image data generation unit 22 that generates luminance system image data that is image data related to luminance on the basis of the image data of each color of multiple colors (R, G and B in this example) obtained by the image capturing unit 18; a restoration filter storage unit 24 that stores restoration filter F to perform restoration processing on luminance system image data (or image data of each color); and a restoration processing unit 26 that performs point image restoration processing on luminance system image data (or image data of each color) by using restoration filter F stored in the restoration filter storage unit 24.

A restoration filter generation device 80 is configured including: an information acquisition unit 82 that acquires an optical transfer function corresponding to point image distribution in the optical system 14 of the digital camera 10 and difference information (which may be referred to as "OTF difference" below) showing a difference in the optical transfer function; a restoration filter generation unit 84 that generates restoration filter F on the basis of the information acquired by the information acquisition unit 82; and a switching unit 86 that switches whether to cause restoration filter F to perform phase correction of luminance system image data (or image data of each color).

As "optical transfer function" acquired by the information acquisition unit 82, for example, there are a PSF (Point Spread Function: which may be referred to as "point image distribution function" or "point spread function" below) and a so-called OTF (Optical Transfer Function: which may be referred to as "complex OTF" or "complex optical transfer function") obtained by Fourier transform of the PSF. The complex OTF includes an MTF (Modulation Transfer Function: which may be referred to as "modulation transfer function" or "amplitude transfer function" below) and a PTF (Phase Transfer Function: which may be referred to as "phase transfer function" below). A case where only the MTF or the PTF is acquired as "optical transfer function" is also included. Moreover, it may be a case where "optical transfer function" includes at least one of the modulation component (which may be referred to as "amplitude component" below) and the phase component and at least one of the MTF and the PTF is calculated from the optical transfer function. That is, "optical transfer function" includes information that indirectly shows at least one of the MTF and the PTF.

For example, as difference information (which may be referred to as "OTF difference") on the optical transfer function acquired by the information acquisition unit 82, there are an OTF difference by a color (a color on a color space of a certain color system) that appears in luminance system image data (or image data of each color), an individual difference by manufacture of the optical system 14, and an OTF difference by imaging conditions at imaging by the digital camera 10 (image capturing apparatus). Here, "a difference by the color of the optical transfer function of the optical system" is a difference among the optical transfer functions of respective colors in the optical system.

The information acquisition unit 82 of this example may acquire the optical transfer function of each color and calculate a difference by the color of the optical transfer function on the basis of the optical transfer function of each color.

The restoration filter generation unit 84 generates a restoration filter that weakens the restoration strength according to a difference in the optical transfer function, on the basis of information (optical transfer function and difference information) acquired by the information acquisition unit 82. Specifically, the restoration filter generation unit 84 makes the restoration strength of a generated restoration filter weaker than the restoration strength of an ideal filter decided assuming no difference in the optical transfer function, every spatial frequency.

<Restoration Processing>

Figure 2:
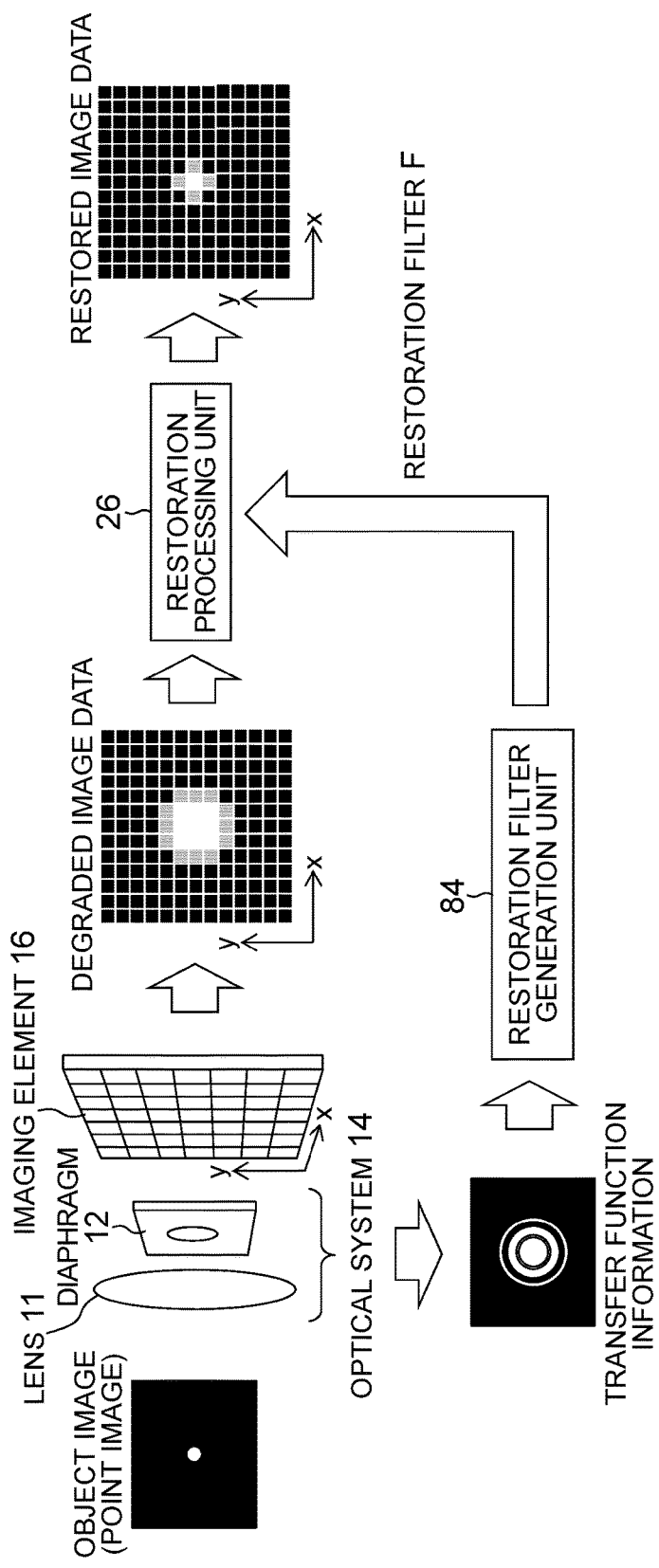
FIG. 2 is an explanatory diagram to describe the principle of point image restoration processing.

FIG. 2 is an explanatory diagram to describe the principle of point image restoration processing. FIG. 2 illustrates a case where a point image is taken as an object image, for ease of understanding. The object image is formed on the imaging surface of the imaging element 16 through the optical system 14 including a lens 11 and a diaphragm 12, and is taken by the imaging element 16. Degraded image data which is image data whose object image is degraded due to the aberration of the optical system 14 is output from the imaging element 16. Then, the characteristic of degradation in the optical system 14 is found beforehand as an optical transfer function corresponding to imaging conditions (for example, a diaphragm value, a focal distance, an object distance and a lens type, and so on). Moreover, restoration filter F for point image restoration processing is generated by the restoration filter generation unit 84 in FIG. 1 on the basis of the optical transfer function and difference information. Restoration filter F is used by the restoration processing unit 26 in FIG. 1 to perform point image restoration processing (restoration processing) that cancels the degradation of degraded image data. By doing so, it is possible to obtain restored image data whose degradation is canceled.

As illustrated in FIG. 3, the point image restoration processing can be roughly classified into "phase correction" (which may be referred to as "phase restoration") and "amplitude correction" (which may be referred to as "amplitude restoration"). "Phase correction" is image processing that restores a degraded phase characteristic (PTF) in an optical system. An asymmetric point spread shape can be corrected to a point-symmetry point spread shape by the phase correction. "Amplitude correction" is image processing that restores the degraded amplitude characteristic (MTF) in an optical system. A point spread shape can be corrected to a point (delta function) by the amplitude correction. However, it may not be completely restored to the point shape if a blur is serious or the SN ratio is poor.

Moreover, since the aberration of an optical system varies according to the wavelength, it is ideally preferable to perform point image restoration processing using a restoration filter that varies every color (for example, R, G and B). However, when the point image restoration processing is performed on the image data of each color of multiple colors (for example, R, G and B), the load of operation processing is large. Therefore, there is a case where the point image restoration processing is performed on luminance system image data with a large visual effect by the restoration processing unit 26 in FIG. 1. In that case, the restoration filter generation unit 84 in FIG. 1 generates restoration filter F for luminance system image data.

<Restoration Processing According to Optical Transfer Function Difference>

FIG. 4 is an explanatory diagram to describe that a difference occurs in an optical transfer function depending on the color. Here, in the figure, the PSF shape of "neutral point" shows the shape of a point spread in a synthetic image that synthesizes R, G and B image data when the neutral point is imaged. Moreover, the PSF shapes of "R", "G" and "B" in the figure show the shapes of a point spread in R, G and B image data respectively. Here, for the convenience of illustration, the luminous intensity is larger as it is whiter in the PSF shape of "neutral point", and the luminous intensity is larger as it is blacker in the PSF shapes of "R", "G" and "B". As illustrated in FIG. 4, a difference occurs among the PSF shape of R (red), the PSF shape of G (green) and the PSF shape of B (blue). Such a difference in the PSF shape corresponds to a difference in a complex OTF including an MTF (modulation transfer function) and a PTF (phase transfer function).

In a case where point image restoration processing is performed on luminance system image data, only the same correction is performed for all colors, unlike a case where individual point image restoration processing is performed on the image data of each color of R, G and B (R image data, G image data and B image data). Therefore, depending on the color, there occurs a harmful problem that the image quality is rather degraded by overcorrection.

In the present invention, it is assumed that "the PSF shape stochastically varies" depending on the color. That is, a difference in an optical transfer function by the color is treated as probability distribution.

Figure 5:
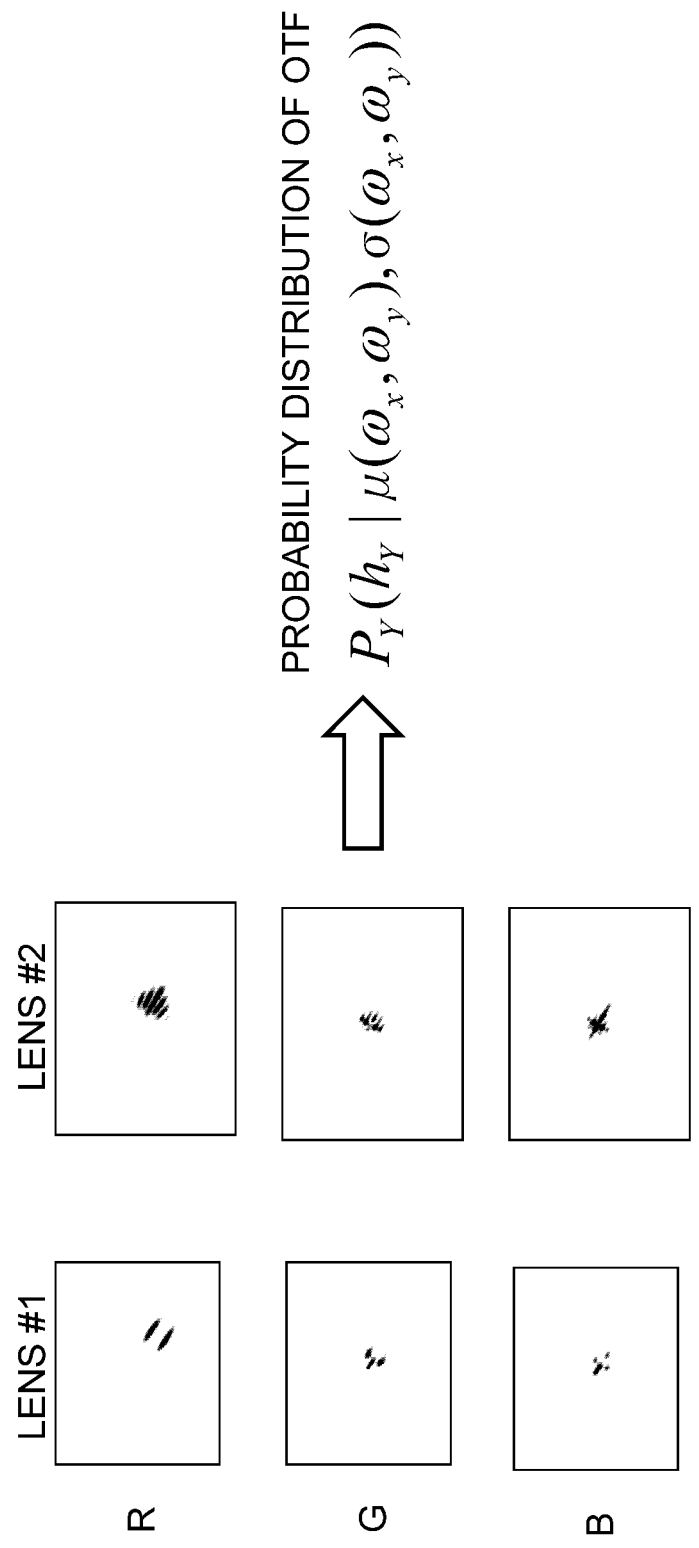
FIG. 5 is an explanatory diagram to describe that an OTF difference depending on the color and an OTF difference by manufacture are treated using a similar probability theory.

FIG. 5 is an explanatory diagram to describe that an OTF difference depending on the color and an OTF difference by manufacture are treated using a similar probability theory.

In FIG. 5, "lens #1" and "lens #2" show different individual optical systems 14 manufactured in the same design specification. The PSF shape of R (red), the PSF shape of G (green) and the PSF shape of B (blue) are different between "lens #1" and "lens #2". Thus, as for the PSF shape, a difference occurs depending on the color, and, moreover, a difference (individual differences) occurs depending on the manufacture of the optical system 14.

If a difference in the PSF shape is defined as "probability distribution", a difference in the PSF shape by the color and a difference in the PSF shape by manufacture can be treated using a similar probability theory. Specifically, when a complex OTF in luminance system image data is assumed to be $h_y$ and the spatial frequency is assumed to be $(\omega_x, \omega_y)$, a difference in the complex OTF by the color and a difference in the complex OTF by manufacture are defined as probability distribution $P_y(h_y|\omega_x, \omega_y)$. That is, an OTF difference by the color and an OTF difference by manufacture are found as dispersion of probability distribution $P_y$ in normal distribution.

Figure 6:
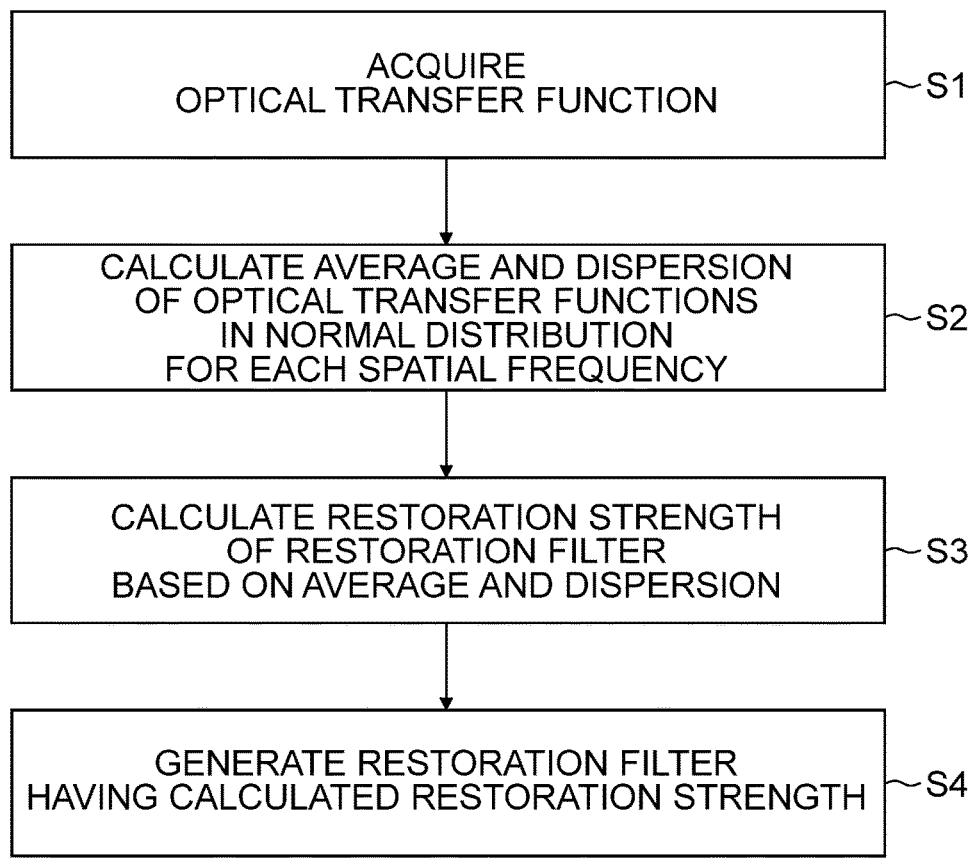
FIG. 6 is a flowchart illustrating the outline of one example of restoration filter generation processing.

FIG. 6 is a flowchart illustrating the outline of one example of restoration filter generation processing by the restoration filter generation unit 84.

In step S1, the optical transfer function in the optical system 14 is acquired by the information acquisition unit 82 for each color of multiple colors (for example, three colors of R, G and B).

In step S2, the average and the dispersion of the optical transfer functions in normal distribution are calculated by the information acquisition unit 82 every spatial frequency $(\omega_x, \omega_y)$, on the basis of the optical transfer function of each color acquired in step S1. That is, it is assumed that a difference in the optical transfer function follows the normal distribution in the color space of a certain color system, and average $\mu(\omega_x, \omega_y)$ and dispersion $\sigma^2(\omega_x, \omega_y)$ of the optical transfer functions in the normal distribution are calculated as parameters to calculate restoration strength. Here, it can be said that dispersion $\sigma^2(\omega_x, \omega_y)$ is "difference information" acquired (calculated) by the information acquisition unit 82 and average $\mu(\omega_x, \omega_y)$ is an optical transfer function representative showing the center of a difference in the optical transfer function.

In step S3, the restoration strength of a restoration filter is calculated by the restoration filter generation unit 84 on the basis of average $\mu(\omega_x, \omega_y)$ and dispersion $\sigma^2(\omega_x, \omega_y)$ calculated in step S2.

In step S4, a restoration filter having the restoration strength calculated in step S3 is generated with the restoration filter generation unit 84.

Here, the present invention is not limited to a case where a restoration filter having both of the phase correction function and the amplitude correction function is generated, and a restoration filter having at least one of the phase correction function and the amplitude correction function may be generated.

Figure 7:
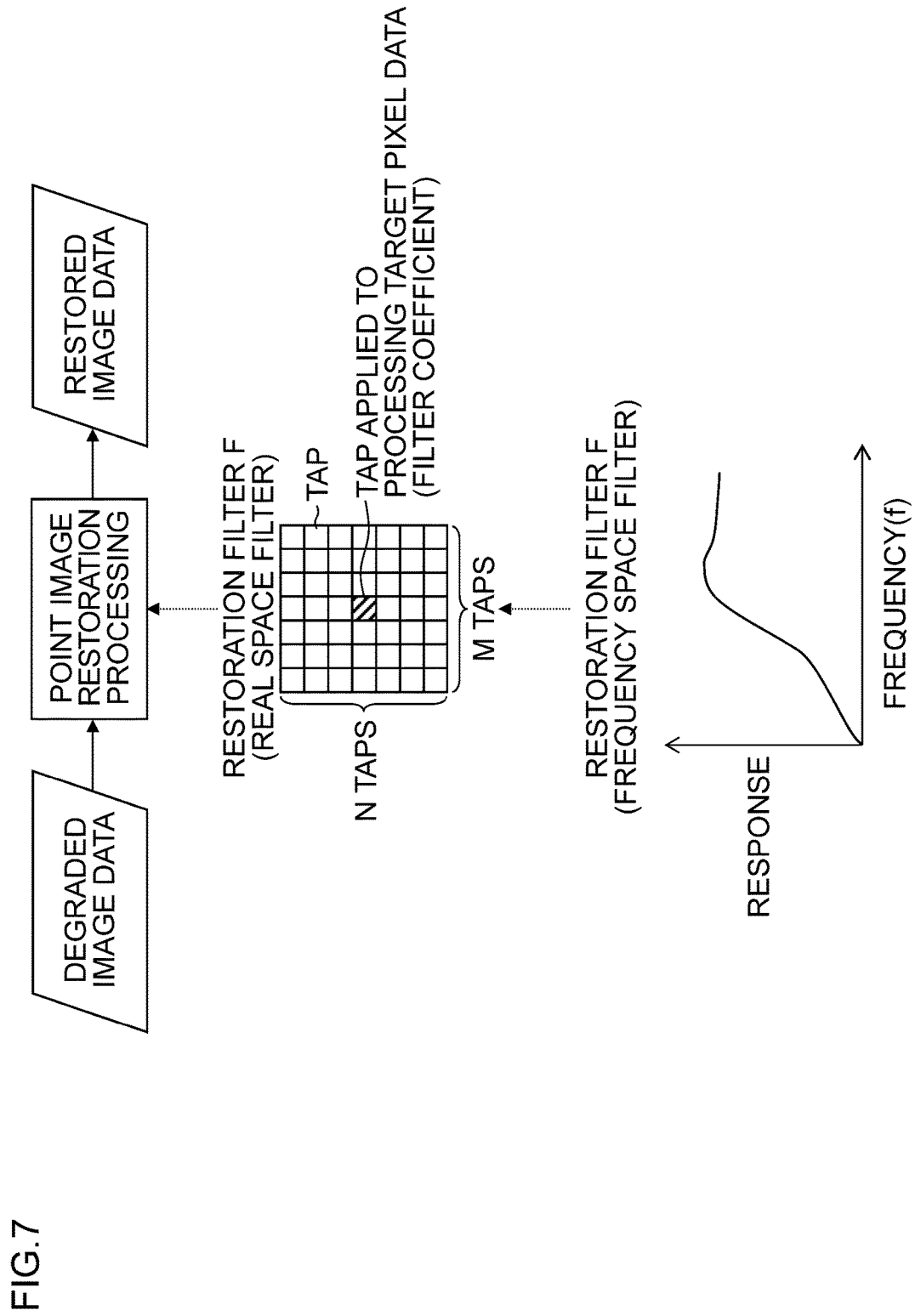
FIG. 7 is a block diagram illustrating the outline of one example of point image restoration processing.

FIG. 7 is a block diagram illustrating the outline of one example of point image restoration processing.

The point image restoration processing is processing that creates restored image data from degraded image data by using restoration filter F. For example, the point image restoration processing is performed using a restoration filter on a real space, which includes N×M (N and M are integers equal to or greater than 2) taps. By this means, pixel data after the point image restoration processing (restored image data) can be calculated by convoluting the filter coefficient assigned to each tap and corresponding image data (processing target pixel data and adjacent pixel data of degraded image data). By applying this convolution operation using restoration filter F to all pixel data forming the image data while sequentially changing the target pixel, it is possible to perform the point image restoration processing.

Here, the restoration filter on the real space, which includes N×M taps, can be derived by performing inverse Fourier transform of a restoration filter on the frequency space (which may be referred to as "spatial frequency domain"). Therefore, the restoration filter on the real space can be arbitrarily calculated by specifying a restoration filter on a base frequency space and specifying the number of taps of a restoration filter on the real space.

<Switching Processing of Restoration Filter Generation>

Figure 8:
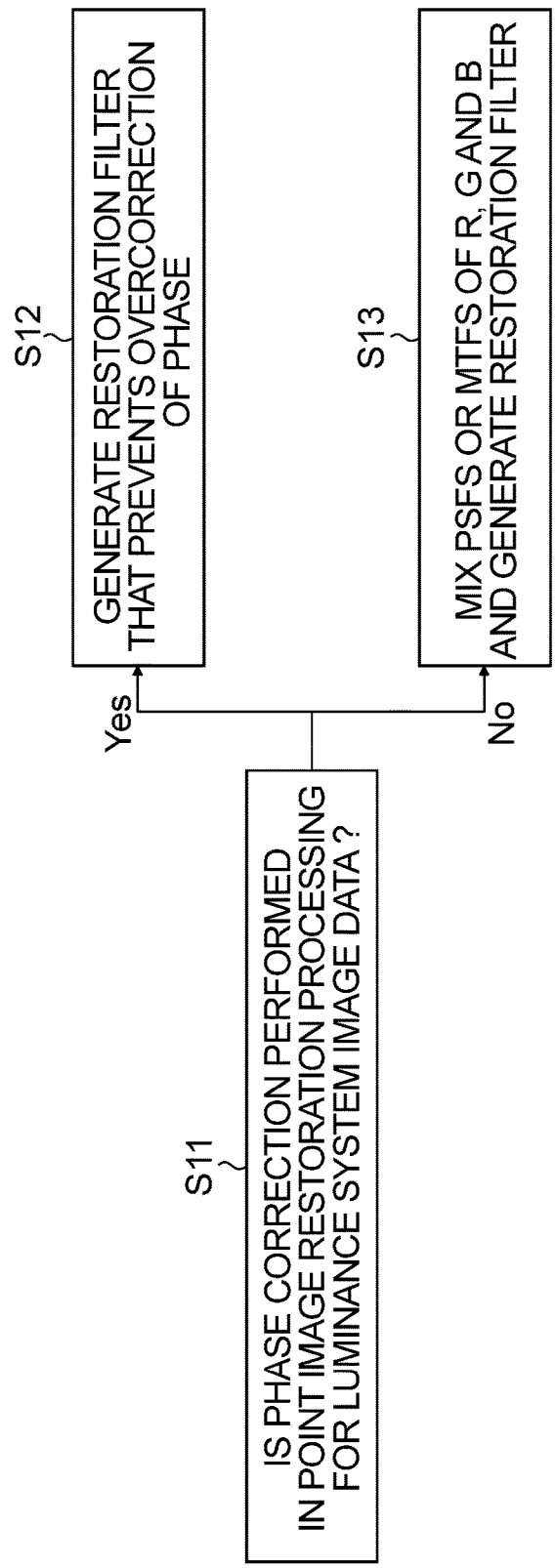
FIG. 8 is a flowchart illustrating the outline of switching processing as to the existence of phase correction execution.

FIG. 8 is a flowchart illustrating the outline of switching processing as to the existence of phase correction execution by the switching unit 86 of the restoration filter generation device 80 in FIG. 1.

In FIG. 8, the switching unit 86 determines whether to cause restoration filter F to perform phase correction (phase restoration) in point image restoration processing with respect to luminance system image data (step S11).

In a case where restoration filter F is caused to perform the phase correction (in the case of "Yes" in step S11), the restoration filter generation unit 84 generates a restoration filter which has a function to perform the phase correction in point image restoration processing with respect to luminance system image data and reduces overcorrection of the phase of the luminance system image data (step S12).

In a case where restoration filter F is not caused to perform the phase correction (in the case of "No" in step S11), the restoration filter generation unit 84 mixes transfer function information (PSF or MTF) on each color of multiple colors (R, G and B) between multiple colors, and, on the basis of the transfer function information (PSF or MTF) mixed between the multiple colors, generates a restoration filter that performs point image restoration processing that changes only the amplitude component without changing the phase component with respect to the luminance system image data (S13). That is, the restoration filter generation unit 84 generates a restoration filter having a function to perform only amplitude correction without performing phase correction in point image restoration processing with respect to the luminance system image data.

Here, since the amplitude correction is not performed for each color of multiple colors (R, G and B) in the amplitude correction with respect to the luminance system image data, there is a possibility that a lack of correction (MTF is less than 1.0) or overcorrection (MTF is greater than 1.0) occurs by any one or two or more colors of multiple colors (R, G and B). However, an excellent restoration filter that suppresses a lack of correction and overcorrection can be generated by causing the restoration filter generation unit 84 to mix transfer function information (PSF or MTF) between multiple colors (R, G and B) and, on the basis of the mixed transfer function information (PSF or MTF), generate a restoration filter that performs amplitude correction that averagely makes a modulation transfer function MTF close to "1".

Next, with an assumption that the optical transfer function acquired by the information acquisition unit 82 is a complex OTF including the MTF and the PTF and difference information on the optical transfer function acquired by the information acquisition unit 82 shows a difference in a complex OTF, restoration filter generation processing is specifically described in respective embodiments. Moreover, in the following embodiments, "difference information on the optical transfer function" is briefly referred to as "OTF difference".

<First Embodiment>

In the first embodiment, a restoration filter of high toughness is generated by generating a restoration filter having restoration strength according to an OTF difference by the color in generation processing of a restoration filter for point image restoration processing with respect to luminance system image data.

Figure 9:
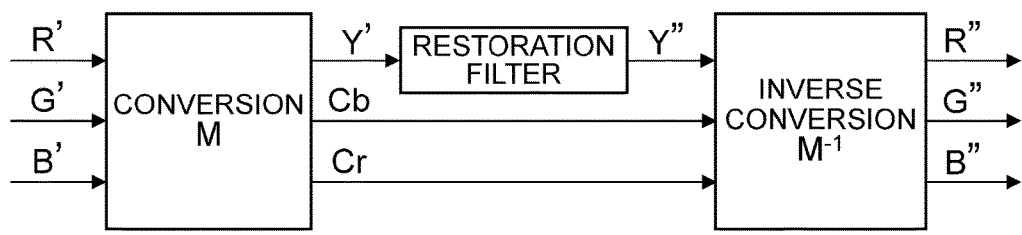
FIG. 9 is a diagram illustrating a restoration processing model to describe restoration filter generation processing.

FIG. 9 illustrates a restoration processing model to describe restoration filter generation processing in the first embodiment. However, the restoration processing model illustrated in FIG. 9 is merely an example, and it may be applied to other restoration processing models.

In FIG. 9, the correspondence relationship between the input pixel values (R', G' and B') of image data of respective colors input in conversion M and the output pixel values (Y', Cb and Cr) of luminance system image data output from conversion M is expressed by the following equation.

$$\begin{pmatrix} Y' \\ Cb \\ Cr \end{pmatrix} = M \begin{pmatrix} R' \\ G' \\ B' \end{pmatrix}$$ [Expression 1]

Here, conversion M is a map from the RGB color space to the luminance system space (YCbCr color space). This conversion M depends on only "how a restoration filter is applied to a processed signal", which is the definition of a signal processing system in an image processing device. In general, conversion from the RGB space to the luminance system space includes gamma correction and therefore non-linear conversion is required, but it may be linear conversion depending on the implementation mode of luminance system restoration processing.

Figure 10:
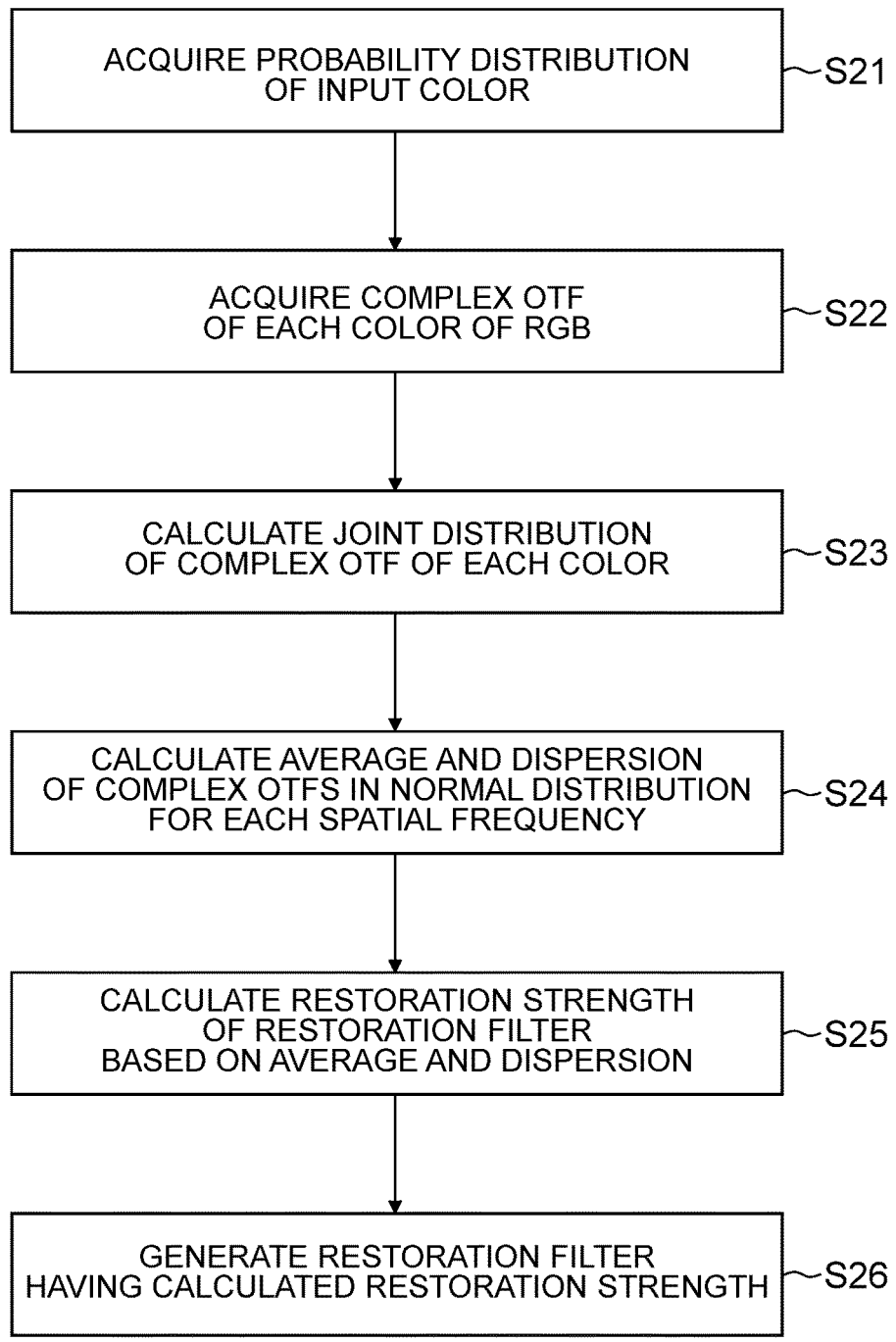
FIG. 10 is a flowchart illustrating the flow of a restoration filter generation processing example in the first embodiment.

FIG. 10 is a flowchart illustrating the flow of a restoration filter generation processing example in the first embodiment.

First, probability distribution $P_{COLOR}$(Y', Cb, Cr) of Y', Cb and Cr is acquired by the information acquisition unit 82 (step S21).

Here, Y' designates the value (input pixel value) of a luminance signal input in restoration filter F in FIG. 9.

$P_{COLOR}$(Y', Cb, Cr) designates color probability distribution in luminance system image data obtained by the digital camera 10. In other words, $P_{COLOR}$(Y', Cb, Cr) designates an input color difference on the color space of a certain color system. For example, this $P_{COLOR}$(r, Cb, Cr) is obtained beforehand when the optical system 14 is designed. In a case where an average color is assumed to be white, Cb=0 and Cr=0 are assumed.

Next, the complex OTF ($OTF_R$, $OTF_G$ and $OTF_B$) of each color of red (R), green (G) and blue (B) is acquired from $P_{COLOR}$(Y', Cb, Cr) by the information acquisition unit 82 (step S22).

Next, joint distribution $P_{RGB}(h_R, h_G, h_B | \omega_x, \omega_y)$ of the complex OTF of each color of red (R), green (G) and blue (B) is calculated by the information acquisition unit 82 (step S23).

Here, joint distribution $P_{RGB}(h_R, h_G, h_B | \omega_x, \omega_y)$ shows a probability that the probability variables of complex OTFs of respective colors of R, G and B become values of $h_R$, $h_G$ and $h_B$, for each spatial frequency ($\omega_x, \omega_y$). Joint distribution $P_{RGB}(h_R, h_G, h_B | \omega_x, \omega_y)$ is calculated as shown in the following equation.

$P_{RGB}(h_R, h_G, h_B | \omega_x, \omega_y) = \iint \delta(h_R/I_R - OTF_R(\omega_x, \omega_y)) \delta(h_G/I_G - OTF_G(\omega_x, \omega_y)) \delta(h_B/I_B - OTF_B(\omega_x, \omega_y)) \times P_{COLOR}(Y', Cb, Cr) dY' dCb dCr$ [Expression 2]

In the above equation, δ( ) designates a Kronecker's delta function. $OTF_R(\omega_x, \omega_y)$, $OTF_G(\omega_x, \omega_y)$ and $OTF_B(\omega_x, \omega_y)$ are complex OTFs as design values that are uniquely decided. On the other hand, $h_R$, $h_G$ and $h_B$ are the probability variables of complex OTFs in a case where there is an input color difference. Moreover, $I_R$, $I_G$ and $I_B$ are defined as shown in the following equation.

$$\begin{pmatrix} I_R \\ I_G \\ I_B \end{pmatrix} = M^{-1} \begin{pmatrix} Y' \\ Cb \\ Cr \end{pmatrix}$$ [Expression 3]

Expression 2 shows that $P_{COLOR}(Y', Cb, Cr)$ is integrated for Y', Cb and Cr only in a case where $h_R/I_R = OTF_R(\omega_x, \omega_y)$, $h_G/I_G = OTF_G(\omega_x, \omega_y)$ and $h_B/I_B = OTF_B(\omega_x, \omega_y)$ are satisfied, and the result of the integration is assumed as joint distribution $P_{RGB}(h_R, h_G, h_B|\omega_x, \omega_y)$. That is, when Expression 2 and Expression 3 are considered, they mean that, in a case where the probability variables of complex OTFs are $h_R$, $h_G$ and $h_B$, regarding all color combinations $\{I_R, I_G, I_B\}$ that satisfy $h_R/I_R = OTF_R(\omega_x, \omega_y)$, $h_G/I_G = OTF_G(\omega_x, \omega_y)$ and $h_B/I_B = OTF_B(\omega_x, \omega_y)$, joint distribution $P_{RGB}(h_R, h_G, h_B|\omega_x, \omega_y)$ is shown as a result (integral value) of adding a possibility (probability) that these combinations happen, in all combinations.

As mentioned above, it is possible to obtain joint distribution $P_{RGB}(h_R, h_G, h_B|\omega_x, \omega_y)$ of complex OTFs of respective colors of red (R), green (G) and blue (B).

Next, average μ and dispersion $\sigma^2$ of complex OTFs in a population of the complex OTFs in a specific color system are calculated by the information acquisition unit 82 for each spatial frequency $(\omega_x, \omega_y)$ (step S24). Here, the population is sets of complex OTFs in a range of a color difference decided beforehand at the time of design.

In this example, it is assumed that an OTF difference in the population follows complex normal distribution (Circular symmetric complex normal distribution), and joint distribution $P_y$ that follows the normal distribution is shown by the following equation with average $\mu(\omega_x, \omega_y)$ and dispersion $\sigma^2(\omega_x, \omega_y)$ as parameters.

$$P_Y(h_Y | \mu(\omega_x, \omega_y), \sigma(\omega_x, \omega_y)) =$$ [Expression 4]
$$\frac{1}{\pi\sigma^2(\omega_x, \omega_y)} \exp\left(-\frac{\|h_Y - \mu(\omega_x, \omega_y)\|^2}{\sigma^2(\omega_x, \omega_y)}\right)$$

Average $\mu(\omega_x, \omega_y)$ and dispersion $\sigma^2(\omega_x, \omega_y)$ which are parameters in the above equation are calculated by the information acquisition unit 82 by maximum likelihood estimation as shown in the following equation.

$$\mu(\omega_x, \omega_y) =$$ [Expression 5]
$$\int\int\int (1\ 0\ 0)M \begin{pmatrix} h_R \\ h_G \\ h_B \end{pmatrix} P_{RGB}(h_R, h_G, h_B | \omega_x, \omega_y) dh_R dh_G dh_B$$

$$\sigma^2(\omega_x, \omega_y) = \int\int\int \left\| (1\ 0\ 0)M \begin{pmatrix} h_R \\ h_G \\ h_B \end{pmatrix} - \mu(\omega_x, \omega_y) \right\|^2$$
$$P_{RGB}(h_R, h_G, h_B | \omega_x \omega_y) dh_R dh_G dh_B$$

By the above-mentioned steps S21 and S22, average $\mu(\omega_x, \omega_y)$ and dispersion $\sigma^2(\omega_x, \omega_y)$ are calculated assuming that a difference by the color of an optical transfer function follows normal distribution, on the basis of probability distribution $P_{COLOR}(Y', Cb, Cr)$ of colors in luminance system image data and optical transfer functions $OTF_R(\omega_x, \omega_y)$, $OTF_G(\omega_x, \omega_y)$ and $OTF_B(\omega_x, \omega_y)$ of respective colors.

Next, the restoration strength of a restoration filter is calculated by the restoration filter generation unit 84 on the basis of average $\mu(\omega_x, \omega_y)$ and dispersion $\sigma^2(\omega_x, \omega_y)$ (step S25).

Here, an expression to calculate the restoration strength is obtained as follows. First, a luminance OTF (OTF of a luminance signal) that reflects an OTF difference in a population in a specific color system is expressed as the following equation.

$$OTF_Y(\omega_x, \omega_y) = \mu(\omega_x, \omega_y) + \Delta\mu(\omega_x, \omega_y)$$ [Expression 6]

In the above equation, $\Delta\mu(\omega_x, \omega_y)$ designates a probability variable that follows complex normal distribution of average 0 and dispersion $\sigma^2(\omega_x, \omega_y)$.

An error criterion in the Wiener filter used for deconvolution in point image restoration processing defines the square error of an original image (an image before degradation by an optical system) and a restoration image as the average (or integral) of an input image (degraded image) and noise. Since an optical transfer function in the error criterion of such a known Wiener filter is defined as a fixed value, if a known deriving equation is used as it is, it is assumed that color toughness is not given to an OTF difference by the color and overcorrection due to luminance correction.

Then, taking into account the OTF difference by the color and the overcorrection due to the luminance correction, an error criterion for the derivation of the Wiener filter, to which the OTF difference by the color is also applied, is derived, instead of using the deriving equation of the known Wiener filter as it is. When the frequency characteristic of a restoration filter is assumed as $f(\omega_x, \omega_y)$, error criterion J[f] averaging signals, noise and OTF difference are expressed as the following equation.

$$J[f] =$$ [Expression 7]
$$\int\int\int (\|1 - f(\omega_x, \omega_y)(\mu(\omega_x, \omega_y) + \Delta\mu)\|^2 S_Y(\omega_x, \omega_y) +$$
$$\|f(\omega_x, \omega_y)\|^2 N_Y(\omega_x, \omega_y)) \times$$
$$\frac{1}{\pi\sigma^2(\omega_x, \omega_y)} \exp\left(-\frac{\|\Delta\mu\|^2}{\sigma^2(\omega_x, \omega_y)}\right) d\omega_x d\omega_y d\Delta\mu$$

Here, $SY(\omega_x, \omega_y)$ and $NY(\omega_x, \omega_y)$ are the signal power and noise power of luminance Y respectively. Frequency characteristic f of the Wiener filter to be found minimizes J of the above equation. When the above equation is developed and integration of $\Delta\mu$ is performed, it is as shown in the following equation.

[Expression 8]

$$J[f] =$$
$$\int\int\int \left\{ \begin{array}{l} 1 - 2Re[f(\omega_x, \omega_y)(\mu(\omega_x, \omega_y) + \Delta\mu)] + \\ \|f(\omega_x, \omega_y)\|^2(\|(\mu(\omega_x, \omega_y))\|^2 + \|\Delta\mu\|^2 + 2Re[\mu^*(\omega_x, \omega_y)\Delta\mu]) \end{array} \right\}$$

-continued $$S_Y(\omega_x, \omega_y) + \|f(\omega_x, \omega_y)\|^2 N_Y(\omega_x, \omega_y)\right\} \times$$

$$\frac{1}{\pi\sigma^2(\omega_x, \omega_y)} \exp\left(-\frac{\|\Delta\mu\|^2}{\sigma^2(\omega_x, \omega_y)}\right) d\omega_x d\omega_y d\Delta\mu =$$

$$\int\int\left\{\begin{bmatrix} 1 - 2Re[f(\omega_x, \omega_y)\mu(\omega_x, \omega_y)] + \\ \|f(\omega_x, \omega_y)\|^2(\|\mu(\omega_x, \omega_y)\|^2 + \sigma^2(\omega_x, \omega_y)) \end{bmatrix} S_Y(\omega_x, \omega_y) + \|f(\omega_x, \omega_y)\|^2 N_Y(\omega_x, \omega_y)\right\} d\omega_x d\omega_y$$

Here, "*" designates a complex conjugate. When this equation (Expression 8) is partially differentiated by $f^*(\omega_x, \omega_y)$ and assumed as 0, complex frequency characteristic $f(\omega_x, \omega_y)$ of the Wiener filter to be found is as shown in the following equation.

[Expression 9]

$$f(\omega_x, \omega_y) = \frac{\mu^*(\omega_x, \omega_y) S_Y(\omega_x, \omega_y)}{(\|\mu(\omega_x, \omega_y)\|^2 + \sigma^2(\omega_x, \omega_y)) S_Y(\omega_x, \omega_y) + N_Y(\omega_x, \omega_y)}$$

Here, it can be said that complex frequency characteristic $f(\omega_x, \omega_y)$ designates the restoration strength of a restoration filter.

As shown in the above equation, by weakening restoration strength (increasing the denominator of the right side of the above equation) in a spatial frequency with a large difference shown by dispersion $\sigma^2(\omega_x, \omega_y)$, it is possible to generate a restoration filter having a toughness characteristic with respect to a difference by the color. The restoration filter generation unit 84 in this example makes the restoration strength weaker in a spatial frequency with a larger OTF difference by the color.

Next, a restoration filter having the restoration strength calculated in step S25 is generated by the restoration filter generation unit 84 (step S26).

With respect to complex frequency characteristic $f(\omega_x, \omega_y)$ found by the processes in steps S21 to S25, a filter coefficient of the restoration filter is calculated so as to approximate the complex frequency characteristic of a real restoration filter within a given tap number.

Figure 11:
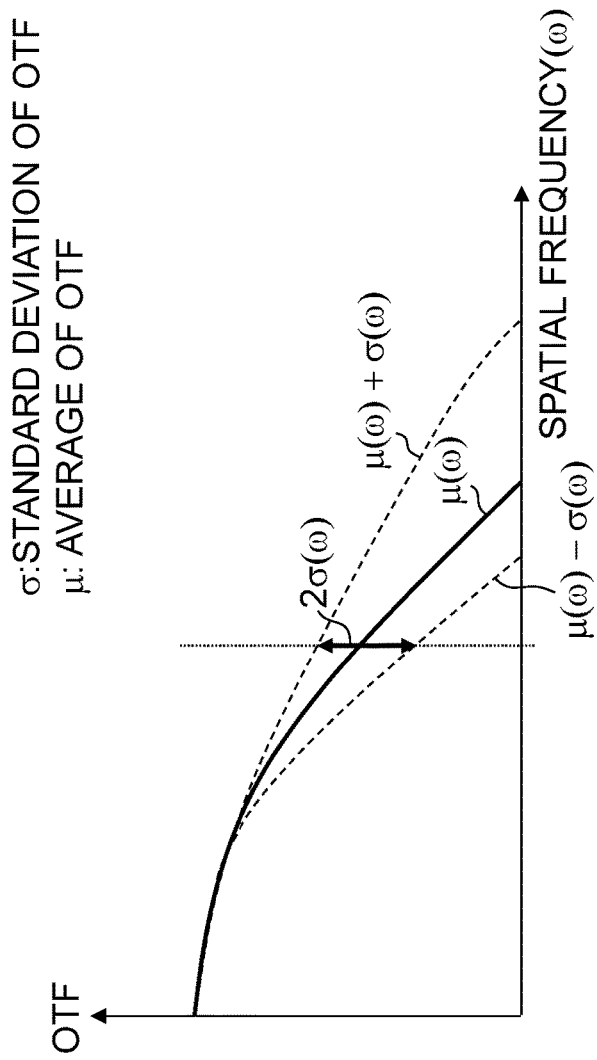
FIG. 11 illustrates examples of average μ with respect to spatial frequency ω in normal distribution of an optical transfer function, average μ+standard deviation σ, and average μ−standard deviation σ.

FIG. 11 illustrates averages $\mu(\omega)$, $\mu(\omega)+\sigma(\omega)$ and $\mu(\omega)-\sigma(\omega)$ in normal distribution for only the real part (MTF) of a complex OTF for ease of understanding. If the restoration strength of a restoration filter is calculated on the basis of average $\mu(\omega)$ without considering an OTF difference, there is a possibility that overcorrection is given in a spatial frequency with large $\sigma$. Then, in the present invention, the restoration strength of the restoration filter is calculated so as to be $\mu(\omega)+\sigma(\omega)$ (or so as to be close to $\mu(\omega)+\sigma(\omega)$) in a spatial frequency with large $\sigma$.

As described above, according to the present embodiment, it is possible to accurately suppress an artifact caused because an optical transfer function differs by the input color from what is assumed, in point image restoration processing of luminance system image data.

Here, in a case where phase correction is not performed, restoration filter generation is performed by rejecting the phase characteristic of frequency characteristics of a found restoration filter, approximating only to the amplitude characteristic and calculating the filter coefficient of the restoration filter.

<Second Embodiment>

As a factor of an OTF difference to be considered in restoration filter generation processing, there are a manufacturing difference in the optical system 14 and a difference in imaging conditions at imaging in an image capturing apparatus (for example, a measurement error of an object distance) in addition to colors considered in the first embodiment. In the following, as an example, a high-toughness restoration filter generation processing example taking into account an OTF difference by manufacture of the optical system 14 is described. Moreover, the OTF difference by manufacture or the OTF difference by imaging conditions are phenomena that occur not only in luminance system image data but also in image data of respective colors. Then, in the following, a case where a restoration filter for point image restoration with respect to image data of respective colors of R, G and B is generated is described as an example.

Probability distribution corresponding to the OTF difference by manufacture is used to calculate restoration strength corresponding to the OTF difference by manufacture of the optical system 14.

First, joint distribution $P_{OTF}(h_R, h_G, h_B|\omega_x, \omega_y)$ showing distribution of an OTF difference in the optical system 14 by manufacture is acquired by the information acquisition unit 82.

$P_{OTF}(h_R, h_G, h_B|\omega_x, \omega_y)$ designates inherent information obtained by mechanism analysis and mass production sample measurement of difference generation in the manufacture of the optical system 14. When respective complex OTFs of R, G and B in spatial frequency $\omega_x, \omega_y$ are assumed as $h_R, h_G$ and $h_B$, the OTF difference follows joint distribution $P_{OTF}(h_R, h_G, h_B|\omega_x, \omega_y)$. Here, in this example, it is assumed that $P_{OTF}(h_R, h_G, h_B|\omega_x, \omega_y)$ is constructed (calculated) beforehand.

As a note when $P_{OTF}(h_R, h_G, h_B|\omega_x, \omega_y)$ is constructed, there is the following problems. The parallel displacement of a PSF shape can be expressed by a complex OTF, but, in a case where an OTF difference is assumed including a parallel displacement difference (PSF image formation position difference) and is modeled and an OTF average in the OTF difference is adopted, there may occur a problem that a real average aberration is not appropriately expressed and an MTF is excessively degraded. As measures against the problem, there is a method of constructing $P_{OTF}(h_R, h_G, h_B|\omega_x, \omega_y)$ on the basis of a PSF sample (or OTF sample) that is aligned beforehand with the PSF barycentric position of a standard color (for example, green) as a center. In this method, the position of the standard color PSF is standardized, but difference information on relative PSF barycentric coordinates between colors is held and an individual difference is reflected to the restoration strength of a restoration filter.

Next, average $\mu$ and dispersion $\sigma^2$ of OTFs in normal distribution are calculated by the information acquisition unit 82 every spatial frequency $(\omega_x, \omega_y)$.

In this example, the OTF difference of each spatial frequency $\omega_x, \omega_y$ of R, G and B image data (image data of respective colors) input in restoration filter F is modeled as complex normal distribution (circular symmetric complex normal distribution) like the following equation. In this example, since it is a signal processing system that can perform correction for each color of R, G and B, an OTF difference is found for each color. When index K showing a color is assumed as K|≡{R, G, B}, joint distribution $P_K$ showing the OTF difference of each color is expressed as the following equation.

$$P_K(h_K \mid \mu_K(\omega_x, \omega_y), \sigma_K(\omega_x, \omega_y)) = \quad \text{[Expression 10]}$$

$$\frac{1}{\pi \sigma_K^2(\omega_x, \omega_y)} \exp\left(-\frac{\|h_K - \mu_K(\omega_x, \omega_y)\|^2}{\sigma_K^2(\omega_x, \omega_y)}\right)$$

Here, average $\mu_K(\omega_x, \omega_y)$ and dispersion $\sigma K2(\omega x, \omega y)$ which are parameters in the above equation are found by maximum likelihood estimation like the following equation.

$$\mu_K(\omega_x,\omega_y) = \iiint h_K P_{RGB}(h_R,h_G,h_B|\omega_x,\omega_y) dh_R dh_G dh_B$$

$$\sigma_K^2(\omega_x,\omega_y) = \iiint \|h_K - \mu K(\omega_x,\omega_y)\|^2 P_{RGB}(h_R,h_G,h_B|(\omega_x,\omega_y) dh_R dh_G dh_B \quad \text{[Expression 11]}$$

Similar to the first embodiment, the frequency characteristic of a restoration filter is found using OTF difference information of each color obtained as above, and a restoration filter having restoration strength corresponding to the frequency characteristic is generated.

According to the present embodiment, in point image restoration processing of RGB image data or luminance system image data, it is possible to accurately suppress an artifact caused because an optical transfer function differs from what is assumed, which is due to a manufacturing difference (or imaging condition difference) of an optical system. Moreover, individual specificity information on each optical system 14 is not required, and it is possible to generate a restoration filter only from stochastic statistical information on an OTF difference.

<Third Embodiment>

In the third embodiment, in generation processing of a restoration filter for point image restoration processing with respect to luminance system image data, a restoration filter of high toughness is generated according to not only an OTF difference by the color but also an OTF difference by manufacture of an optical system. Here, a manufacturing difference of an optical system is enumerated as an example in the present embodiment, but even a difference in imaging conditions such as an object distance can be discussed in the same way as the present embodiment. That is, it only has to generate a restoration filter having restoration strength corresponding to the difference in imaging conditions.

In the following, matters different from the first embodiment are described, and detailed explanation is omitted for matters similar to the first embodiment or the second embodiment.

First, $P_{COLOR}(Y', Cb, Cr)$ defined in the first embodiment and $P_{OTF}(h_R, h_G, h_B|\omega_x, \omega_y)$ defined in the second embodiment are acquired by the information acquisition unit 82 (step S41). $P_{COLOR}(Y', Cb, Cr)$ designates probability distribution showing a difference in colors in luminance system image data. Moreover, $P_{OTF}(h_R, h_G, h_B\kappa\omega_x, \omega_y)$ designates joint distribution showing an OTF difference in the optical system 14 by manufacture.

Next, as shown in the following equation, by performing operation that mixes both of $P_{COLOR}(Y', Cb, Cr)$ and $P_{OTF}(h_R, h_G, h_B|\omega_x, \omega_y)$, OTF difference function $P_{RGB}(h_R, h_G, h_B|\omega_x, \omega_y)$ of each color of R, G and B is calculated (acquired) by the information acquisition unit 82 (step S42). This $P_{RGB}(h_R, h_G, h_B|\omega_x, \omega_y)$ designates joint distribution showing the OTF difference of each color of R, G and B.

$$P_{RGB}(h_R,h_G,h_B|\omega_x,\omega_y) = \iiint P_{OTF}(h_R/I_R,h_G/I_G,h_B|\omega_x,\omega_y) P_{COLOR}(Y',Cb,Cr) dY' dCb dCr \quad \text{[Expression 12]}$$

In the above equation, $I_R$, $I_G$ and $I_B$ are defined as the following equation.

$$\begin{pmatrix} I_R \\ I_G \\ I_B \end{pmatrix} = M^{-1} \begin{pmatrix} Y' \\ Cb \\ Cr \end{pmatrix} \quad \text{[Expression 13]}$$

As described above, after OTF difference function $P_{RGB}(h_R, h_G, h_B|\omega_x, \omega_y)$ of each color of R, G and B is acquired, dispersion $\sigma^2$ (or standard deviation $\sigma$) is calculated assuming that an OTF difference is subjected to normal distribution in the same way as the first embodiment. Next, that dispersion $\sigma^2$ (or standard deviation $\sigma$) is assumed as a parameter and the frequency characteristic of restoration filter F is calculated. Next, restoration filter F having the calculated frequency characteristic of restoration filter F is generated.

According to the present embodiment, in point image restoration processing of luminance system image data, it is possible to accurately suppress an artifact caused because an optical transfer function differs by the input color from what is assumed, and it is possible to accurately suppress an artifact caused because an optical transfer function (PSF shape) differs from what is assumed, which is due to a manufacturing difference of an optical system. Moreover, individual specificity information on each optical system 14 is not required, and it is possible to generate a restoration filter only from stochastic statistical information on an OTF difference amount.

<Configuration Example of Digital Camera>

Figure 12:
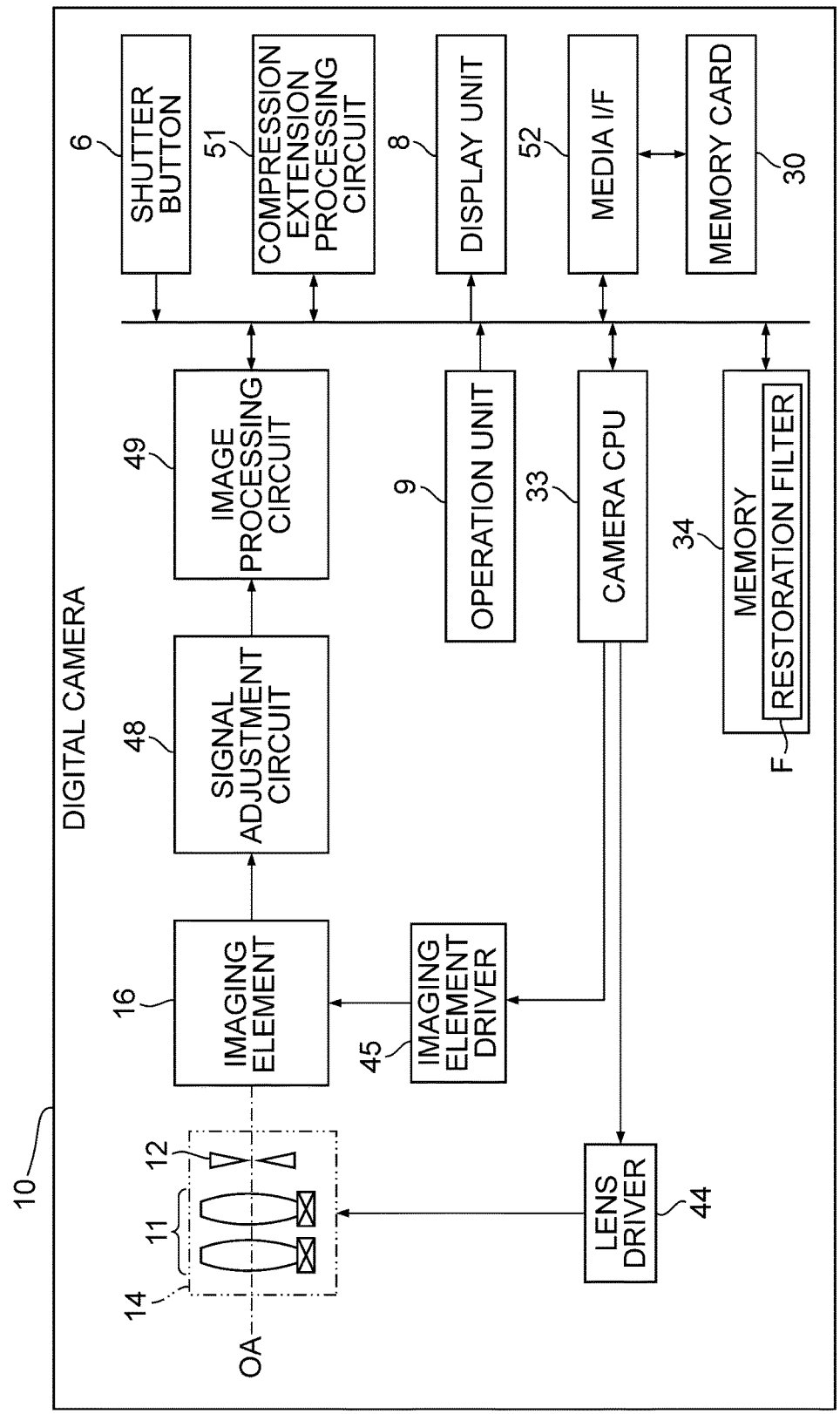
FIG. 12 is a block diagram illustrating a hardware configuration example of a digital camera.

FIG. 12 is a block diagram illustrating a hardware configuration example of the digital camera 10.

In FIG. 12, a CPU 33 sequentially performs various kinds of programs and data read from a memory 34 on the basis of an instruction input in an operation unit 9 and controls each unit of the digital camera 10 in an integral manner.

In the memory 34 corresponding to the restoration filter storage unit 24 in FIG. 1, restoration filter F is stored in addition to the above-mentioned various kinds of programs. Moreover, the memory 34 functions as a work memory to perform processing by the CPU 33 or a temporary storage destination of various kinds of data.

The single-plate color imaging element 16 is disposed behind the optical system 14. The optical system 14 is controlled by lens driver 44. Multiple pixels disposed in a matrix manner in a predetermined pattern array (a Bayer array, a G stripe R/G full-checkered pattern, an X-Trans array and a honeycomb array, and so on) are formed on the imaging surface of the imaging element 16. Each pixel includes a microlens, color filters (color filters of R (red), G (green) and B (blue) in this example) and a photodiode. The imaging element 16 and the optical system 14 form an image capturing apparatus (image capturing device) in the present invention, and an object image formed on the imaging surface by the optical system 14 is converted into an electrical output signal and output. Here, various kinds of imaging elements such as a CCD (Charge Coupled Device) color imaging element and a CMOS (Complementary Metal Oxide Semiconductor) color imaging element are used as the imaging element 16. An imaging element driver 45 controls the drive of the imaging element 16 under the control of the CPU 33.

A signal adjustment circuit 48 performs various kinds of signal adjustment processing on the output signal output from the imaging element 16, and generates RGB mosaic image data R1, G1 and B1 according to a color filter array of the imaging element 16. Here, in a case where the imaging element 16 is a CCD type, for example, the signal adjustment circuit 48 includes a CDS/AGC circuit and an A/D conversion circuit, and so on, and, in a case where it is a CMOS type, for example, it includes an amplifier, and so on.

An image processing circuit 49 forms an image processing device of the present invention. This image processing circuit 49 performs black level adjustment processing, white balance correction processing, gamma correction processing, demosaic processing, YC conversion processing and point image restoration processing, and so on, on the mosaic image data of each color of multiple colors R, G and B input from the signal adjustment circuit 48, and generates luminance system image data Y and color difference system image data Cb and Cr. Luminance system image data Y and color difference system image data Cb and Cr are temporarily stored in the VRAM region of the memory 34 (the VRAM can be separately installed).

The VRAM region has a memory area for a live view image that stores two consecutive field images. Luminance system image data Y and color difference system image data Cb and Cr stored in the VRAM region are sequentially output to a display unit 8. By this means, a live view image is displayed on the display unit 8.

When a shutter button 6 of the operation unit 9 is pressed in an imaging mode, a compression extension processing circuit 51 performs compression processing on luminance system image data Y and color difference system image data Cb and Cr stored in the VRAM region. Moreover, the compression extension processing circuit 51 performs extension processing on compressed image data obtained from a memory card 30 through a media I/F 52. The media I/F 52 records and reads the compressed image data for the memory card 30.

Figure 13:
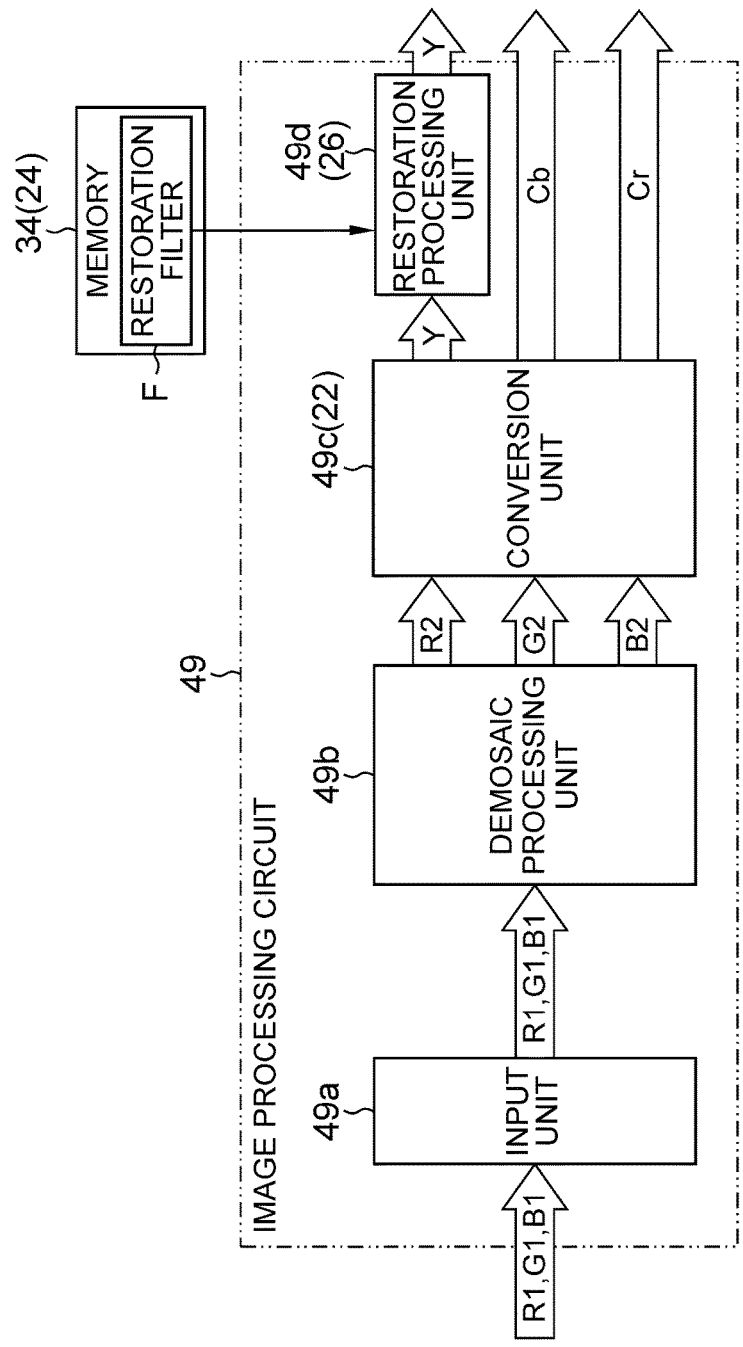
FIG. 13 is a block diagram illustrating a configuration example of the image processing circuit in FIG. 12.

As illustrated in FIG. 13, the image processing circuit 49 mainly includes an input unit 49*a*, a demosaic processing unit 49*b*, a conversion unit 49*c* (corresponding to the luminance system image data generation unit 22 in FIG. 1) and a restoration processing unit 49*d* (26 in FIG. 1). Here, the image processing circuit 49 includes correction processing units that perform white balance correction processing and gamma correction processing, and so on, but illustration and explanation of these correction processing units are omitted to prevent complication of explanation.

The input unit 49*a* outputs mosaic image data R1, G1 and B1 of respective colors of RGB input from the signal adjustment circuit 48 to the demosaic processing unit 49*b*. That is, the input unit 49*a* functions as an input I/F in which the image data of each color obtained by imaging by the imaging element 16 is input.

The demosaic processing unit 49*b* performs demosaic processing (which may be referred to as "synchronization processing") that calculates color information on all of RGB every pixel (conversion into a synchronous system) on the basis of mosaic image data R1, G1 and B1 of respective colors, and generates RGB image data R2, G2 and B2 including color data of three of RGB. The demosaic processing unit 49*b* outputs RGB image data R2, G2 and B2 to the conversion unit 49*c*.

The conversion unit 49*c* (luminance system image data generation unit 22) performs YC conversion processing on RGB image data R2, G2 and B2, and generates luminance system image data Y and color difference system image data Cb and Cr. For example, luminance system image data Y is generated according to equation [Y=0.3R+0.6G+0.1B]. Since the contribution rate of the G color becomes 60% in this equation, the G color has a higher contribution ratio than the R color (contribution rate of 30%) and the B color (contribution rate of 10%). Therefore, the G color is a color that contributes to a luminance signal most among three primary colors.

Here, explanation is given by exemplifying the value of a luminance signal of a color space shown by "Y, Cb, Cr" as luminance system image data Y in the present embodiment, but it is not especially limited as long as it is data that contributes to the luminance of an image, and it means various kinds of data having information on the luminance of a taken image. For example, data with the highest contribution rate to obtain a luminance signal and data corresponding to a color filter of a color that contributes to luminance most, and so on, are enumerated.

The restoration processing unit 49*d* (26 in FIG. 1) reads restoration filter F stored in the memory 34 and performs restoration processing on luminance system image data Y using this restoration filter F. This restoration processing is performed only on luminance system image data Y with a large visual effect to decrease the load of operation processing. By performing point image restoration processing, image degradation (such as a blur) due to an aberration of the optical system 14 is corrected.

A point image (optical image) that penetrates the optical system 14 is formed on the imaging surface of the imaging element 16 as a large point image (blurred image) as shown as "degraded image data" in FIG. 2, but it is restored to a small point image (image of high resolution) as "restored image data" in FIG. 2 by point image restoration processing.

<Configuration Example of Restoration Filter Generation Device>

Figure 14:
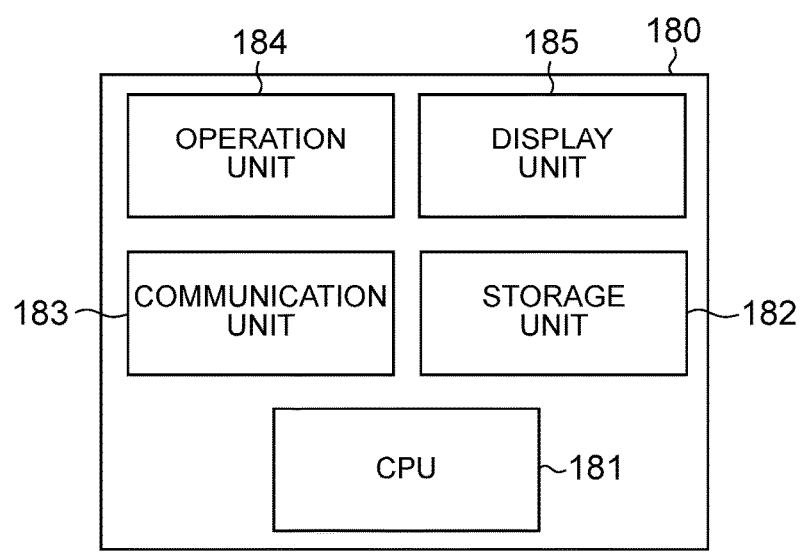
FIG. 14 is a block diagram illustrating a hardware configuration example of a restoration filter generation device.

FIG. 14 is a block diagram illustrating a hardware configuration example of a computer device 180 used as the restoration filter generation device 80.

A CPU 181 controls each unit of the computer device 180 in FIG. 14. A storage unit 182 stores a restoration filter generation processing program, an optical transfer function and difference information on the optical transfer function. As this storage unit 182, it is possible to use various kinds of non-temporary recording media including various kinds of magneto-optical recording media such as a hard disk drive, a compact disk and a DVD besides a ROM and an EEPROM, and semiconductor memories such as an SSD (Solid State Drive). A communication unit 183 performs communication through a server device (illustration is omitted) and a network, and acquires the optical transfer function and the difference information on the optical transfer function from the server device through a network. An operation unit 184 accepts an instruction input from an operator. A display unit 185 displays various kinds of information.

In the computer device 180 in FIG. 14, the communication unit 183 may form the information acquisition unit 82 in FIG. 1. The CPU 181 may form the information acquisition unit 82 in FIG. 1. In this case, the difference information on the optical transfer function is calculated from the optical transfer function by the CPU 181. Moreover, the switching unit 86 in FIG. 1 includes the CPU 181 (or the operation unit 184). Moreover, the restoration filter generation unit 84 in FIG. 1 includes the CPU 181.

<Variation of System>

Explanation is given by exemplifying a case where the restoration filter generation device 80 and the digital camera 10 as an image processing device are individually formed as illustrated in FIG. 1 in the above-mentioned embodiment, but the present invention is not limited to such a case.

Figure 15:
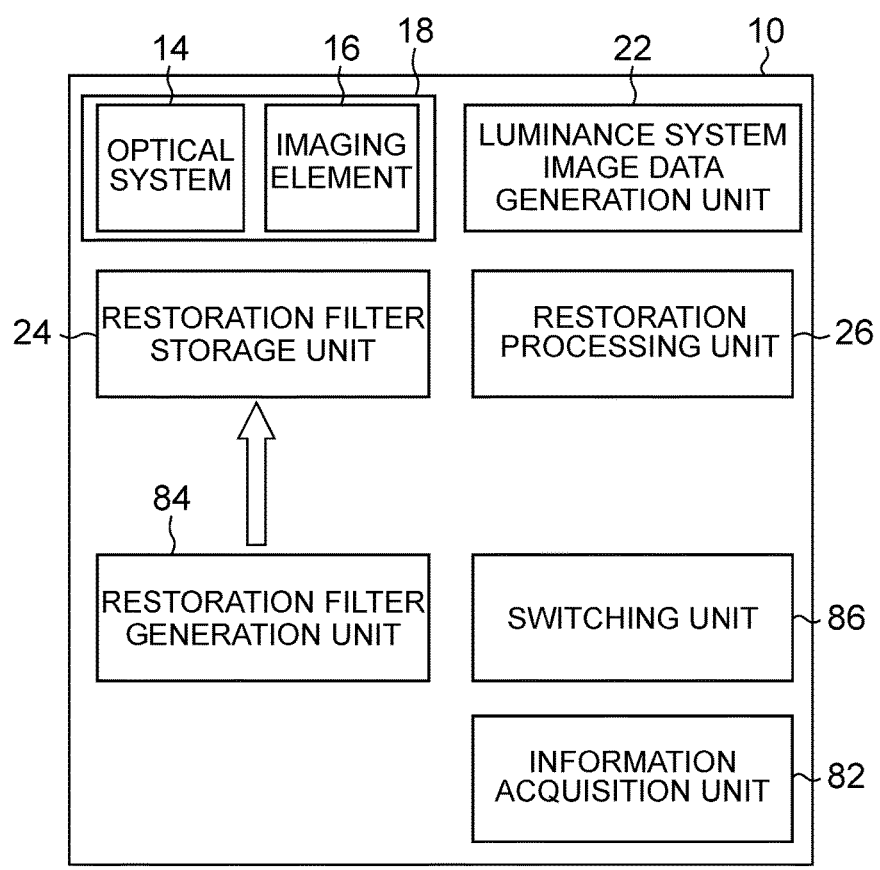
FIG. 15 is a block diagram of a digital camera that wraps a restoration filter generation device and an image processing device.

As illustrated in FIG. 15, it may be a case where the digital camera 10 includes a restoration filter generation device and an image processing device. The digital camera 10 in FIG.

15 includes the information acquisition unit 82, the restoration filter generation unit 84 and the switching unit 86 which form the restoration filter generation device 80 in FIG. 1.

Figure 16:
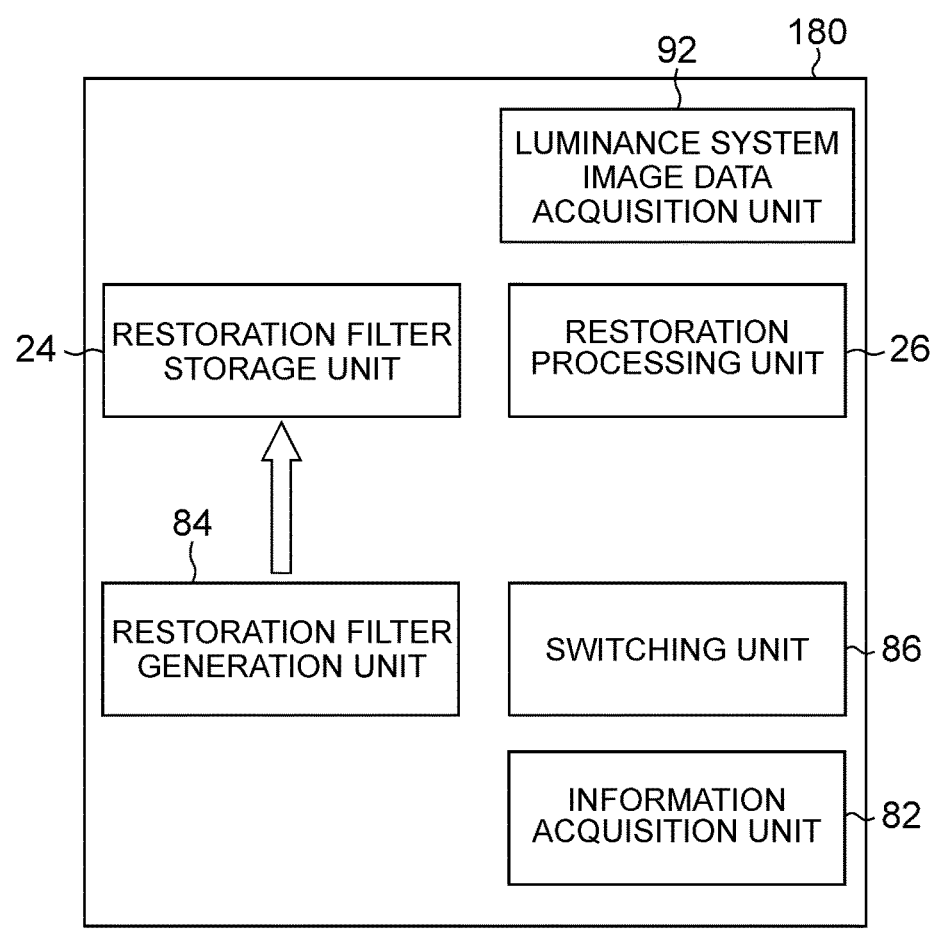
FIG. 16 is a block diagram of a computer device that wraps a restoration filter generation device and an image processing device.

Moreover, as illustrated in FIG. 16, it may be a case where the computer device 180 (for example, the hardware configuration in FIG. 14) includes a restoration filter generation device and an image processing device. The computer device 180 in FIG. 16 includes the restoration filter storage unit 24 and the restoration processing unit 26 which form the digital camera 10 in FIG. 1, and a luminance system image data acquisition unit 92 that acquires luminance system image data. For example, the luminance system image data acquisition unit 92 includes the communication unit 183 in FIG. 14.

Here, the system configuration is not limited in the cases described in FIGS. 1, 15 and 16, and it may be other configurations. The restoration filter generation unit 84 and the restoration processing unit 26 may be installed in other devices such as a server device. For example, in a case where the server device includes the restoration processing unit 26, for example, image data may be transmitted from the digital camera 10 or the computer device 180 to the server device, restoration processing may be performed on this image data in the restoration processing unit 26 of the server device, and the image data after the restoration processing (restored image data) may be transmitted/provided to the transmission source of the image data before the restoration processing.

Moreover, a mode to which the present invention is applicable is not limited to a digital camera, a computer device and a server device, and it is applicable mobile device equipment including other functions than imaging (a telephone call function, a communication function and other computer functions) in addition to an imaging function, besides cameras in which imaging is assumed to be a main function. As other modes to which the present invention is applicable, for example, there are portable telephones, smart phones, PDAs (Personal Digital Assistants) and portable game machines, and so on, which have a camera function. One example of a smart phone to which the present invention is applicable is described later in detail.

<Application Example to EDoF System>

Point image restoration processing (restoration processing) in the above-mentioned embodiment is image processing that restores an original object image by correcting image degradation due to an aberration of an optical system according to specific imaging conditions (for example, a diaphragm value, an F value, a focal distance and a lens kind, and so on), but restoration processing to which the present invention is applicable is not limited to the restoration processing in the above-mentioned embodiment. For example, the restoration processing according to the present invention is applicable to restoration processing with respect to image data imaged and acquired by an optical system (a lens and a diaphragm, and so on) having EDoF (Extended Depth of Field (Focus)). By performing restoration processing on image data of a blurred image taken and acquired in a state where the depth of field (depth of focus) is extended by an EDoF optical system, it is possible to restore and generate image data of high resolution in a state where focusing is performed in a wide range. In this case, restoration processing is performed using a restoration filter which is based on transfer function information (PSF, OTF, MTF and PTF, and so on) on the EDoF optical system and which has a filter coefficient set such that excellent image restoration becomes possible in the range of the extended depth of field (depth of focus).

In the following, one example of a system (EDoF system) related to the restoration of image data imaged and acquired through the EDoF optical system is described. Here, in the following example, an example of performing restoration processing on luminance system image data obtained from image data (RGB data) after demosaic processing is described.

Figure 17:
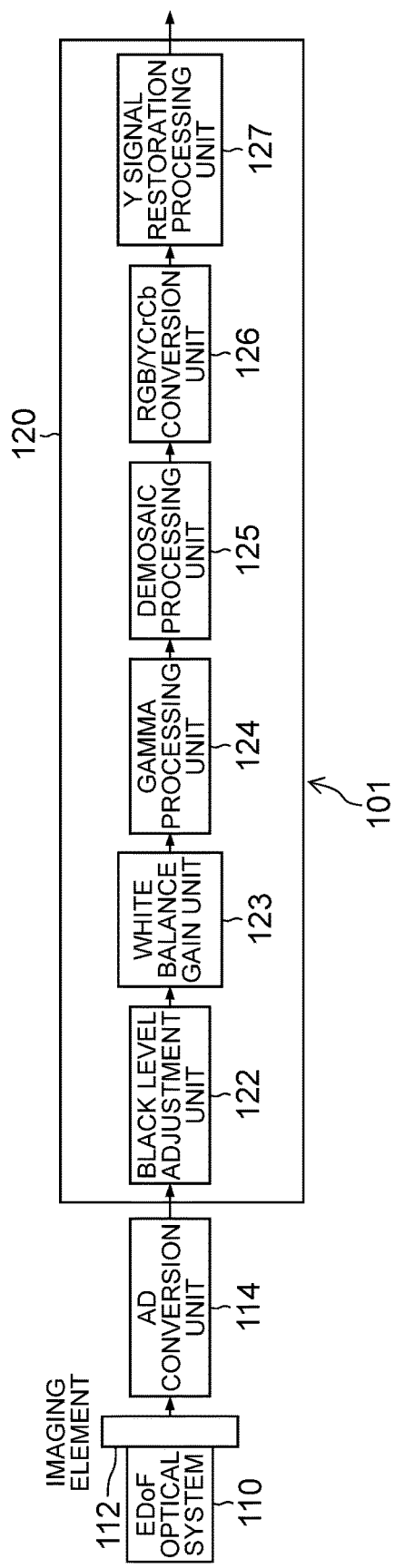
FIG. 17 is a block diagram illustrating one mode of an imaging module including an EDoF optical system.

FIG. 17 is a block diagram illustrating one mode of an imaging module 101 including the EDoF optical system. The imaging module (a digital camera, and so on) 101 of this example includes an EDoF optical system 110 (optical system), an imaging element 112, an AD conversion unit 114 and an image processing unit 120 (restoration processing block).

Figure 18:
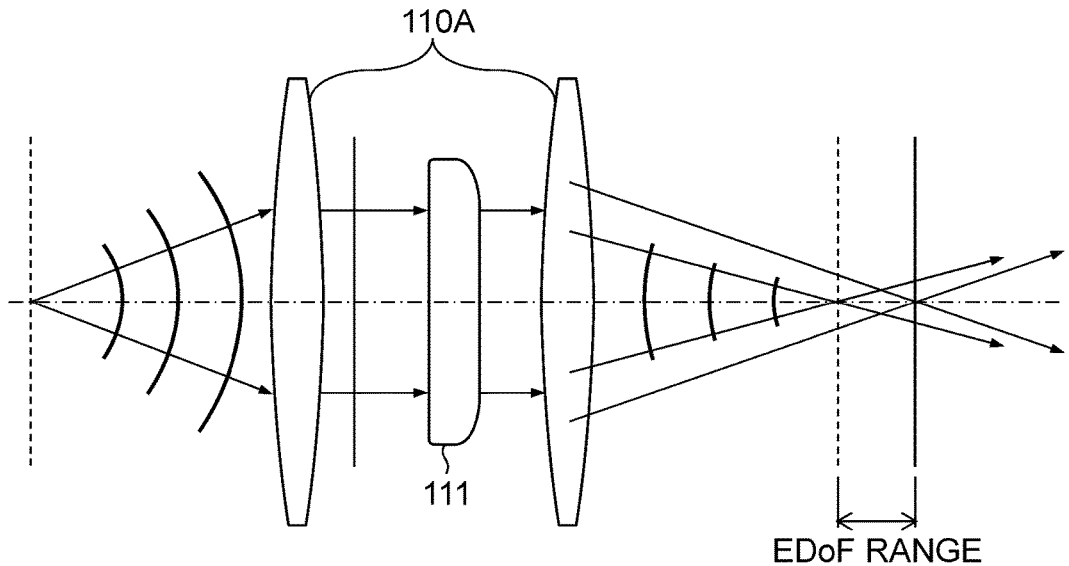
FIG. 18 is a diagram illustrating one example of an EDoF optical system.

FIG. 18 is a diagram illustrating one example of the EDoF optical system 110. The EDoF optical system 110 of this example includes an imaging lens 110A with fixed single focus and an optical filter 111 disposed in a pupil position. The optical filter 111 modulates a phase and achieves EDoF of the EDoF optical system 110 (the optical system 14 in FIG. 1) such that the extended depth of field (depth of focus) (EDoF) is obtained. Thus, the imaging lens 110A and the optical filter 111 form a lens that modulates the phase and extends the depth of field.

Here, the EDoF optical system 110 includes other components according to the necessity, and, for example, a diaphragm (illustration is omitted) is disposed near the optical filter 111. Moreover, one optical filter 111 may be provided or multiple ones may be combined and provided. Moreover, the optical filter 111 is merely one example of an optical phase modulation device, and the achievement of EDoF of the EDoF optical system 110 (the imaging lens 110A) may be realized by other devices. For example, the achievement of EDoF of the EDoF optical system 110 may be realized by the imaging lens 110A whose lens is designed so as to have a function equal to the optical filter 111 of this example instead of installing the optical filter 111, and various kinds of optical wavefront modulation components may be adopted.

That is, the achievement of EDoF of the EDoF optical system 110 can realized by various kinds of device to change the wavefront of image formation on the light receiving surface of the imaging element 112. For example, "an optical element with changed thickness", "an optical element with a changed refractive index (a refractive distribution type wavefront modulation lens, and so on)", "an optical element with changed thickness or refractive index by coding to a lens surface, and so on (a wavefront modulation hybrid lens and an optical element formed on a lens surface as a phase surface)" and "a liquid crystal element (a liquid crystal spatial phase modulation element, and so on) that can modulate the phase distribution of light" can be adopted as an EDoF achievement device of the EDoF optical system 110. Thus, the present invention is applicable to not only a case where image formation that regularly disperses by an optical wavefront modulation element (the optical filter 111 (phase plate)) is possible but also a case where dispersion images similar to the case of using the optical wavefront modulation element can be formed on the imaging lens 110A itself without using the optical wavefront modulation element.

The EDoF optical system 110 of this example can be miniaturized since a focusing adjustment mechanism that mechanically performs focusing adjustment can be omitted, and it can be suitably mounted to a camera-equipped mobile phone and a portable information terminal.

An optical image after passing through the EDoF optical system 110 subjected to EDoF is formed on the imaging surface of the imaging element 112 illustrated in FIG. 17 and converted into an electrical signal here.

The imaging element 112 has basically the same configuration as the imaging element (16 in FIGS. 1, 12 and 15) of each above-mentioned embodiment. The imaging element 112 converts object light formed on the imaging surface by the EDoF optical system 110 into a signal corresponding to the incident ray volume, and outputs an analog RGB image signal.

The AD conversion unit 114 changes an analog RGB image signal output from the imaging element 112 into digital mosaic image data of each color of R, G, and B. The mosaic image data of each color is input in the image processing unit 120.

For example, the image processing unit 120 includes a black level adjustment unit 122, a white balance gain unit 123, a gamma processing unit 124, a demosaic processing unit 125, an RGB/YCrCb conversion unit 126 and a Y signal restoration processing unit 127 (restoration processing unit).

The black level adjustment unit 122 performs black level adjustment on the mosaic image data of each color output from the AD conversion unit 114. A known method can be adopted for black level adjustment. For example, in the case of paying attention to a certain effective photoelectric conversion element, black level adjustment is performed by calculating the average of signals for dark current amount acquisition respectively corresponding to multiple OB photoelectric conversion elements included in a photoelectric conversion element line including the effective photoelectric conversion element and by subtracting the average from a signal for dark current amount acquisition corresponding to the effective photoelectric conversion element.

The white balance gain unit 123 performs gain adjustment corresponding to the white balance gain of each of RGB color signals included in the mosaic image data in which black level data is adjusted.

The gamma processing unit 124 performs gamma correction that performs tone correction of a half tone or the like such that the mosaic image data of each color subjected to white balance adjustment becomes a preferable gamma characteristic.

The demosaic processing unit 125 performs demosaic processing on the mosaic image data of each color after gamma correction, and outputs RGB image data including color data of three of R, G and B.

The RGB/YCrCb conversion unit 126 is basically the same as the luminance system image data generation unit (22 in FIGS. 1 and 15) of each above-mentioned embodiment, performs YC conversion processing on color data of three of R, G and B output from the demosaic processing unit 125, and generates and outputs luminance system image data Y and color difference system image data Cr and Cb.

The Y signal restoration processing unit 127 performs restoration processing on luminance system image data Y from the RGB/YCrCb conversion unit 126 on the basis of a restoration filter stored beforehand. For example, the restoration filter includes a deconvolution kernel (corresponding to the number of taps of M=7 and N=7, for example) having a kernel size of 7×7 and an operation coefficient (corresponding to restoration gain data and a filter coefficient) corresponding to the deconvolution kernel, and is used for deconvolution processing (deconvolution operation processing) for the phase modulation of the optical filter 111. Here, as for the restoration filter, what corresponds to the optical filter 111 is stored in an unillustrated memory. Moreover, the kernel size of the deconvolution kernel is not limited to the one of 7×7.

Figure 19:
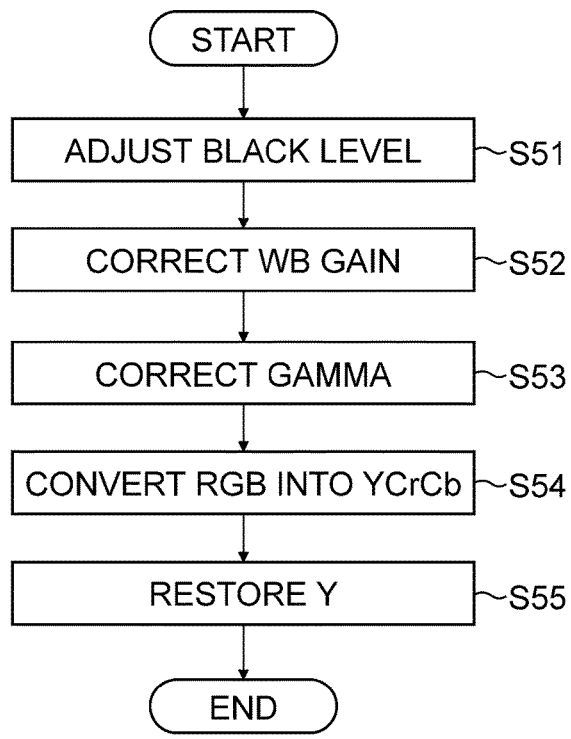
FIG. 19 is a flowchart illustrating one example of restoration processing in a restoration processing unit of a digital camera including an EDoF optical system.

Next, restoration processing by the image processing unit 120 (restoration processing block) is described using the flowchart illustrated in FIG. 19.

The mosaic image data of each color is input from the AD conversion unit 114 into one input of the black level adjustment unit 122 and black level data is input in the other input. The black level adjustment unit 122 subtracts the black level data from the mosaic image data of each color and outputs the mosaic image data of each color after this subtraction processing to the white balance gain unit 123 (step S51). By this means, the black level component is not included in the mosaic image data of each color.

Processing by the white balance gain unit 123 and the gamma processing unit 124 is sequentially performed on the mosaic image data of each color after black level adjustment (steps S52 and S53).

After the mosaic image data of each color subjected to gamma correction is subjected to demosaic processing in the demosaic processing unit 125, it is converted into luminance system image data Y and color difference system image data Cr and Cb in the RGB/YCrCb conversion unit 126 (step S54).

The Y signal restoration processing unit 127 performs restoration processing that performs deconvolution processing for the phase modulation of the optical filter 111 of the EDoF optical system 110 on luminance signal Y (step S55). That is, the Y signal restoration processing unit 127 performs deconvolution processing (deconvolution operation processing) of a luminance signal (here, a luminance signal of 7×7 pixels) corresponding to a pixel group of a predetermined unit centering on an arbitrary processing target pixel and a restoration filter (a 7×7 convolution kernel and the operation coefficient) stored beforehand in a memory or the like. The Y signal restoration processing unit 127 performs restoration processing that removes an image blur of the entire image by repeating deconvolution processing every pixel group of this predetermined unit so as to cover the entire area of the imaging surface. The restoration filter is defined according to the position of the center of pixel groups on which the deconvolution processing is performed. That is, a common restoration filter is applied to adjacent pixel groups. Further, it is preferable that a common restoration filter in all pixel groups is applied to simplify the restoration processing.

A point image (optical image) of a luminance signal after passing through the EDoF optical system 110 is formed on the imaging element 112 as a large point image (blurred image), but it is restored to a small point image (image of high resolution) by the deconvolution processing in the Y signal restoration processing unit 127.

As mentioned above, by performing restoration processing on luminance system image data after demosaic processing, it is not necessary to provide parameters of the restoration processing for each of RGB, and it is possible to speed up the restoration processing. Moreover, instead of arranging R, G and B image signals corresponding to R, G and B pixels in scattered positions in one unit respectively and performing deconvolution processing, luminance signals of adjacent pixels are arranged in a predetermined unit and a common restoration filter is applied to the unit to perform deconvolution processing, and therefore the accuracy of restoration processing improves. Here, color difference system image data Cr and Cb are allowed in image quality even if the resolution is not increased by the restoration processing in view of the visual characteristics by person's eyes. Moreover, since color difference system image data Cr and Cb are compressed at higher compressibility than luminance system image data Y in a case where an image is recorded in a compressed format like JPEG, it is less necessary to increase the resolution by the restoration processing. Thus, it is possible to realize both of the improvement of restoration accuracy and the simplification and speeding up of processing.

The point image restoration processing according to each embodiment of the present invention is applicable even to restoration processing in the EDoF system described above. In this case, the restoration filter generation device of each above-mentioned embodiment generates a restoration filter having a filter coefficient which is set such that excellent image restoration is possible within the range of the extended depth of field (depth of focus), on the basis of transfer function information on an EDoF optical system.

<Configuration of Smart Phone>

A digital camera and a computer device are exemplified as the image processing device and the image capturing apparatus of the present invention in each above-mentioned embodiment, but, for example, the present invention is also applicable to a portable telephone, a smart phone, a PDA (Personal Digital Assistants), a tablet terminal and a portable game machine, which have an imaging function. In the following, a smart phone is enumerated as an example and detailed explanation is given with reference to the drawings.

Figure 20:
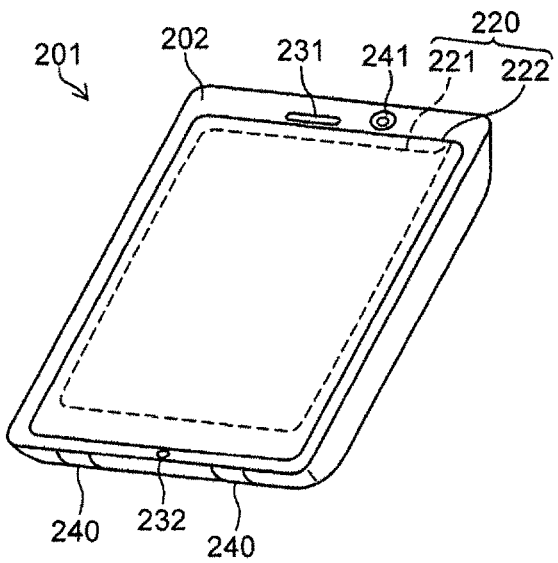
FIG. 20 is an outline drawing of a smart phone.

FIG. 20 illustrates the appearance of a smart phone 201 which is one embodiment of the image capturing apparatus of the present invention. The smart phone 201 illustrated in FIG. 20 has a tubular chassis 202, and includes a display input unit 220 in which a display panel 221 as a display unit on one surface of the chassis 202 and an operation panel 222 as an input unit are unified. Moreover, the chassis 202 includes a speaker 231, a microphone 232, an operation unit 240 and a camera unit 241. Here, the configuration of the chassis 202 is not limited to this, and, for example, it is possible to adopt a configuration in which the display unit and the input unit are independent or a configuration having a folded structure or a sliding mechanism.

Figure 21:
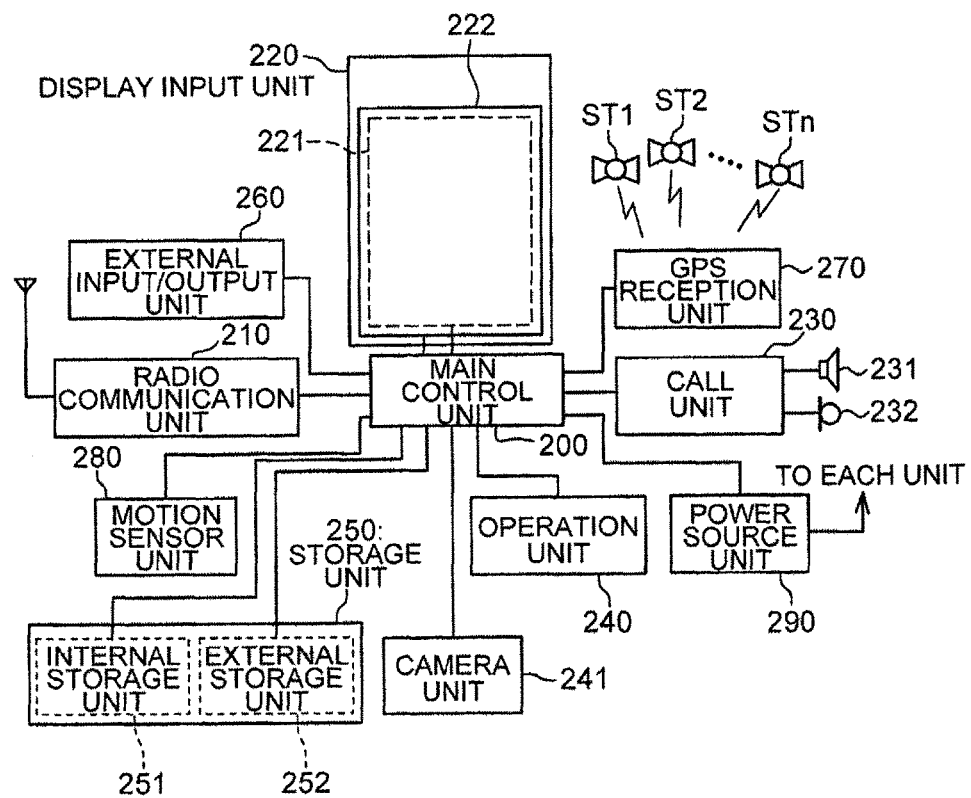
FIG. 21 is a block diagram illustrating the composition of the smart phone illustrated in FIG. 20.

FIG. 21 is a block diagram illustrating the configuration of the smart phone 201 illustrated in FIG. 20. As illustrated in FIG. 21, as main components of the smart phone, a radio communication unit 210, the display input unit 220, a call unit 230, the operation unit 240, the camera unit 241, a storage unit 250, an external input/output unit 260, a GPS (Global Positioning System) reception unit 270, a motion sensor unit 280, a power source unit 290 and a main control unit 200 are included. Moreover, as a main function of the smart phone 201, a radio communication function to perform mobile radio communication through base station device BS and mobile communication network NW is included.

The radio communication unit 210 performs radio communication with base station apparatus BS accommodated in mobile communication network NW according to an instruction of the main control unit 200. By using the radio communication, various kinds of file data such as audio data and image data and email data are transmitted and received or web data and streaming data, and so on, are received.

The display input unit 220 is a so-called touch panel that displays images (still image and moving image) and character information, and so on, visually conveys information to the user and detects a user operation with respect to the displayed information according to the control of the main control unit 200, and includes the display panel 221 and the operation panel 222.

Regarding the display panel 221, an LCD (Liquid Crystal Display) or an OELD (Organic Electro-Luminescence Display) is used as a display device. The operation panel 222 is a device which is placed such that an image displayed on the display surface of the display panel 221 is visualized and which detects one or multiple coordinates operated by user's finger or stylus. When the device is operated by user's finger or stylus, a generated detection signal due to the operation is output to the main control unit 200. Next, the main control unit 200 detects the operation position (coordinates) on the display panel 221 on the basis of the received detection signal.

As illustrated in FIG. 20, the display panel 221 and the operation panel 222 of the smart phone 201 exemplified as one embodiment of the image capturing apparatus of the present invention form the display input unit 220 in a unified fashion, but they are disposed such that the operation panel 222 completely covers the display panel 221. In a case where the disposition is adopted, the operation panel 222 may include a function to detect a user's operation even in an area outside the display panel 221. In other words, the operation panel 222 may include a detection area about an overlapping part that overlaps with the display panel 221 (hereafter referred to as a display area) and a detection area about the remaining outer edge part that does not overlap with the display panel 221 (hereafter referred to as a non-display area).

Here, the size of the display area and the size of the display panel 221 may be completely matched, but both of them do not have to be necessarily matched. Moreover, the operation panel 222 may include two response areas of the outer edge part and the remaining inner side part. In addition, the width of the outer edge part is arbitrarily designed according to the size of the chassis 202, and so on. Furthermore, as a position detection scheme adopted in the operation panel 222, there are a matrix switch scheme, a resistance film scheme, a surface elastic wave scheme, an infrared ray scheme, an electromagnetic induction scheme and an electrostatic capacitance scheme, and so on, and any scheme can be adopted.

The call unit 230 includes the speaker 231 and the microphone 232, converts user's voice input through the microphone 232 into voice data that can be processed in the main control unit 200 and outputs it to the main control unit 200, or decodes voice data received by the radio communication unit 210 or the external input/output unit 260 and outputs it from the speaker 231. Moreover, as illustrated in FIG. 20, for example, the speaker 231 can be mounted to the same surface as a surface in which the display input unit 220 is installed, and the microphone 232 can be mounted to the side surface of the chassis 202.

The operation unit 240 is a hardware key using a key switch, and so on, and accepts an instruction from the user. For example, as illustrated in FIG. 20, the operation unit 240 is a push-button switch which is mounted to the side surface of the chassis 202 of the smart phone 201 and which is turned on when being pressed by a finger or the like and gets in an OFF state by the restorative force of a spring or the like when the finger is released.

The storage unit 250 stores a control program or control data of the main control unit 200, application software, address data associated with the name or telephone number of a communicating party, data of transmitted and received email, web data downloaded by web browsing and downloaded content data, or temporarily stores streaming data. Moreover, the storage unit 250 includes an internal storage unit 251 incorporated in the smart phone and an external storage unit 252 having a detachable external memory slot. Here, each of the internal storage unit 251 and the external storage unit 252 forming the storage unit 250 is realized using a storage medium (computer-readable non-temporary recording medium) such as a memory of a flash memory type, hard disk type, multimedia card micro type or card type (for example, Micro SD (registered trademark) memory, and so on), a RAM (Random Access Memory) and a ROM (Read Only Memory).

The external input/output unit 260 plays the role of an interface with all external equipment coupled with the smart phone 201, and directly or indirectly connects with other external equipment by communication or the like (for example, a universal serial bus (USB) and IEEE1394, and so on) or a network (such as the Internet, wireless LAN, Bluetooth (registered trademark), RFID (Radio Frequency Identification), infrared communication (infrared data association: IrDA) (registered trademark), UWB (Ultra Wideband) (registered trademark) and ZigBee (registered trademark), and so on).

As external equipment coupled with the smart phone 201, for example, there are a wired/wireless headset, a wired/wireless external battery charger, a wired/wireless data port, a memory card or SIM (Subscriber Identity Module Card)/UIM (User Identity Module Card) card connected through a card socket, external audio/video equipment connected through an audio/video I/O (Input/Output) terminal, external audio/video equipment connected by wireless, a smart phone connected by wire/wireless, a personal computer connected by wire/wireless, a PDA connected by wire/wireless, a personal computer connected by wire/wireless, and earphones, and so on. The external input/output unit 260 may transmit data received from such external equipment, to each component in the smart phone 201, or transmit data in the smart phone 201 to the external equipment.

The GPS reception unit 270 receives GPS signals transmitted from GPS satellites ST1 to STn according to an instruction of the main control unit 200, performs positioning operation processing based on multiple received GPS signals and detects a position formed with the latitude, longitude and altitude of the smart phone 201. The GPS reception unit 270 can detect the position by using position information when the position information can be acquired from the radio communication unit 210 or the external input/output unit 260 (for example, wireless LAN).

The motion sensor unit 280 includes an acceleration sensor of three axes, for example, and detects the physical movement of the smart phone 201 according to an instruction of the main control unit 200. By detecting the physical movement of the smart phone 201, the movement direction and acceleration of the smart phone 201 are detected. The detection result is output to the main control unit 200.

The power source unit 290 supplies power accumulated in a battery (not illustrated) to each part of the smart phone 201 according to an instruction of the main control unit 200.

The main control unit 200 includes a microprocessor, performs operation according to a control program or control data stored in the storage unit 250, and integrally controls each part of the smart phone 201. Moreover, in order to perform voice communication or data communication through the radio communication unit 210, the main control unit 200 includes a mobile communication control function to control each part of a communication system and an application processing function.

The application processing function is realized when the main control unit 200 performs operation according to the application software stored in the storage unit 250. As the application processing function, for example, there are an infrared communication function to control the external input/output unit 260 and perform data communication with facing equipment, an email function to transmit and receive email, and a web browsing function to browse web pages, and so on.

Moreover, the main control unit 200 includes an image processing function to display an image on the display input unit 220, and so on, on the basis of image data (data of a still image or moving image) such as reception data and downloaded streaming data. The image processing function denotes a function that the main control unit 200 decodes the above-mentioned image data, performs image processing on the decoding result and displays an image on the display input unit 220.

In addition, the main control unit 200 performs display control with respect to the display panel 221 and operation detection control to detect a user operation through the operation unit 240 and the operation panel 222.

By the execution of the display control, the main control unit 200 displays an icon to activate application software and a software key such as a scrollbar, or displays a window to create email. Here, the scrollbar denotes a software key to receive an instruction to move a display part of an image, regarding a large image that cannot be settled in the display area of the display panel 221, and so on.

Moreover, by the execution of the operation detection control, the main control unit 200 detects a user operation through the operation unit 240, accepts an operation with respect to the above-mentioned icon or the input of a character string with respect to an input column of the above-mentioned window through the operation panel 222, or accepts a scroll request of a display image through the scrollbar.

In addition, by the execution of the operation detection control, the main control unit 200 includes a touch panel control function to: determine whether the operation position with respect to the operation panel 222 is an overlapping part (display area) that overlaps with the display panel 221 or it is the remaining outer edge part (non-display area) that does not overlap with the display panel 221; and control a reaction area of the operation panel 222 and the display position of the software key.

Moreover, the main control unit 200 can detect a gesture operation with respect to the operation panel 222 and execute a preset function according to the detected gesture operation. The gesture operation is not a conventional simple touch operation and means an operation to draw a trajectory by a finger, and so on, specify multiple positions at the same time or combine these to draw a trajectory of at least one of multiple positions.

The camera unit 241 is a digital camera that takes an electronic image by using an imaging element such as a CMOS (Complementary Metal Oxide Semiconductor) and a CCD (Charge-Coupled Device). Moreover, by the control of the main control unit 200, the camera unit 241 can convert image data acquired by imaging into compressed image data such as JPEG (Joint Photographic coding Experts Group), for example, record it in the storage unit 250 and output it through the external input/output unit 260 or the radio communication unit 210. In the smart phone 201 as illustrated in FIG. 20, the camera unit 241 is mounted to the same surface as the display input unit 220, but the mounting position of the camera unit 241 is not limited to this and may be mounted to the back surface of the display input unit 220 or multiple camera units 241 may be mounted. Here, in a case where multiple camera units 241 are mounted, it is possible to switch the camera unit 241 for imaging and use it alone to take an image, or take images by using multiple camera units 241 at the same time.

Moreover, the camera unit 241 can be used for various kinds of functions of the smart phone 201. For example, it is possible to display an image acquired in the camera unit 241 on the display panel 221 or use the image of the camera unit 241 as one of operation inputs of the operation panel 222. Moreover, when the GPS reception unit 270 detects a position, it is possible to detect the position with reference to the image from the camera unit 241. Furthermore, with reference to the image from the camera unit 241, it is possible to determine the optical axis direction of the camera unit 241 of the smart phone 201 and determine the current usage environment without using the acceleration sensor of three axes or with using the acceleration sensor of three axes together. Naturally, it is possible to use the image from the camera unit 241 in application software.

Additionally, it is possible to attach position information acquired by the GPS reception unit 270, voice information (which may be text information by performing voice text conversion by the main control unit, and so on) acquired by the microphone 232 and attitude information acquired by the motion sensor unit 280, and so on, to image data of a still image or moving image and record it in the storage unit 250, or output it through the external input/output unit 260 or the radio communication unit 210.

In the above-mentioned smart phone 201, for example, each above-mentioned processing unit related to point image restoration processing can be arbitrarily realized by the main control unit 200 and the storage unit 250, and so on.

It is needless to say that the present invention is not limited to the above-mentioned embodiments and various changes can be made without departing from the spirit of the present invention.

Here, the present invention is not limited to the examples described in this specification and the examples illustrated in the drawings, and it is natural that various design changes and improvements can be performed without departing from the scope of the present invention.

What is claimed is:

1. A restoration filter device that generates a restoration filter to perform restoration processing on luminance system image data which is generated based on image data of each color obtained in an image capturing apparatus having an optical system and which is image data related to luminance, comprising:
    one or more processors configured to perform the functions of:
    an information acquisition unit that acquires difference information showing a difference that depends on a color of an optical transfer function of the optical system;
    a restoration filter generation unit that generates the restoration filter; and
    a restoration processing unit that performs the restoration processing on the luminance system image data based on the restoration filter,
    wherein the restoration filter generation unit generates the restoration filter which weakens restoration strength according to the difference that depends on the color, based on the difference information acquired by the information acquisition unit, and which makes the restoration strength weaker than restoration strength of an ideal filter decided assuming that the difference that depends on the color does not exist.

2. The restoration filter device according to claim 1, wherein the difference information is dispersion of the optical transfer function calculated assuming that the difference that depends on the color follows normal distribution.

3. The restoration filter device according to claim 1, wherein the information acquisition unit acquires an optical transfer function of each color and calculates the difference that depends on the color based on the optical transfer function of each color.

4. The restoration filter device according to claim 3, wherein:
    the information acquisition unit calculates an average and dispersion of the optical transfer function, assuming that the difference that depends on the color follows normal distribution; and
    the restoration filter generation unit generates the restoration filter based on the average and the dispersion of the optical transfer function.

5. The restoration filter device according to claim 4, wherein the restoration filter generation unit generates the restoration filter based on an equation in which members of the average and the dispersion are set to a denominator.

6. The restoration filter device according to claim 4, wherein the restoration filter generation unit calculates the average and the dispersion for each spatial frequency, and generates the restoration filter based on the average and the dispersion of the each spatial frequency.

7. The restoration filter device according to claim 1, wherein the restoration filter generation unit further generates a restoration filter that makes the restoration strength weaker in a spatial frequency in which the difference that depends on the color is larger.

8. The restoration filter device according to claim 1, wherein the information acquisition unit acquires color probability distribution in the luminance system image data obtained in the image capturing apparatus and the optical transfer function of each color, and, based on the acquired color probability distribution in the luminance system image data and the acquired optical transfer function of each color, calculates the difference information assuming that the difference that depends on the color follows normal distribution.

9. The restoration filter device according to claim 1, wherein the restoration filter generation unit generates the restoration filter that performs restoration processing with at least phase restoration.

10. The restoration filter device according to claim 1, wherein the restoration filter generation unit generates the restoration filter that performs restoration processing without phase restoration.

11. The restoration filter device according to claim 1, wherein the restoration filter generation unit generates a Wiener filter as the restoration filter.

12. The restoration filter device according to claim 1, wherein the optical system has a lens unit that modulates a phase and extends a depth of field.

13. An image processing device comprising:
    an image data acquisition unit that acquires luminance system image data which is generated based on image data of each color obtained in an image capturing apparatus having an optical system and which is image data related to luminance;
    a restoration filter storage unit that stores a restoration filter generated by the restoration filter device according to claim 1; and the restoration processing unit according to claim 1 that performs restoration processing on the luminance system image data acquired in the image data acquisition unit, using the restoration filter stored in the restoration filter storage unit.

14. An image capturing apparatus comprising:

an optical system;

an imaging element that outputs image data of each color of multiple colors; and the image processing device according to claim 13.

* * * * *